(12) United States Patent
Mohaban et al.

(10) Patent No.: US 7,586,899 B1
(45) Date of Patent: Sep. 8, 2009

(54) METHODS AND APPARATUS PROVIDING AN OVERLAY NETWORK FOR VOICE OVER INTERNET PROTOCOL APPLICATIONS

(75) Inventors: Shai Mohaban, Sunnyvale, CA (US); Benjamin J. Getz, Ramat Ha-Sharon (IL); Itzhak Parnafes, Palo Alto, CA (US); Opher Kahane, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1116 days.

(21) Appl. No.: 10/196,796

(22) Filed: Jul. 16, 2002

Related U.S. Application Data

(63) Continuation-in-part of application No. 09/775,274, filed on Jan. 31, 2001, now Pat. No. 7,002,993.

(60) Provisional application No. 60/226,207, filed on Aug. 18, 2000.

(51) Int. Cl.
*H04L 12/66* (2006.01)
(52) U.S. Cl. ..................... 370/352; 370/395.5
(58) Field of Classification Search .............. None
See application file for complete search history.

(56) References Cited

U.S. PATENT DOCUMENTS

| | | | |
|---|---|---|---|
| 5,790,548 A | 8/1998 | Sistanizadeh et al. ........ 370/401 |
| 5,903,559 A * | 5/1999 | Acharya et al. ............. 370/355 |
| 6,069,890 A | 5/2000 | White et al. ................ 370/352 |
| 6,259,695 B1 | 7/2001 | Ofek ........................... 370/389 |
| 6,275,470 B1 * | 8/2001 | Ricciulli ..................... 370/238 |
| 6,282,192 B1 | 8/2001 | Murphy et al. ............. 370/352 |
| 6,298,057 B1 | 10/2001 | Guy et al. ................... 370/389 |
| 6,335,927 B1 | 1/2002 | Elliott et al. ................ 370/352 |
| 6,363,319 B1 * | 3/2002 | Hsu ........................... 701/202 |
| 6,408,001 B1 * | 6/2002 | Chuah et al. ................ 370/392 |
| 6,611,872 B1 * | 8/2003 | McCanne ................... 709/238 |
| 6,614,781 B1 * | 9/2003 | Elliott et al. ................ 370/352 |
| 6,724,747 B1 * | 4/2004 | Arango et al. .............. 370/352 |
| 6,795,445 B1 * | 9/2004 | Kabie et al. ................. 370/401 |
| 7,061,921 B1 * | 6/2006 | Sheth ..................... 370/395.52 |
| 7,184,434 B2 * | 2/2007 | Ganti et al. ................ 370/389 |
| 7,239,629 B1 * | 7/2007 | Olshansky et al. .......... 370/353 |

OTHER PUBLICATIONS

D. Awduche et al, "Requirements for Traffic Engineering Over MPLS", Sep. 1999, pp. 1-29.
E. Rosen et al., "Multiprotocol Label Switching Architecture", Jan. 2001, pp. 1-61.

* cited by examiner

*Primary Examiner*—Frank Duong
(74) *Attorney, Agent, or Firm*—Shumaker & Sieffert, P.A.

(57) ABSTRACT

A system and method for transferring Media over IP (MoIP) packets over an overlay network is provided. The system provides specially designed overlay network units located at key points in the IP network effectively creating an overlay network that is capable of interacting both on the overlay level as well as over the standard IP network.

45 Claims, 17 Drawing Sheets

METHODS AND APPARATUS PROVIDING AN OVERLAY NETWORK FOR VOICE OVER INTERNET PROTOCOL APPLICATIONS

RELATED APPLICATIONS

This application is a continuation-in-part of U.S. patent application Ser. No. 09/775,274, now U.S. Pat. No. 7,002, 993, filed on Jan. 31, 2001, which claims priority from U.S. Provisional Patent Application Ser. No. 60/226,207, filed Aug. 18, 2000.

FIELD OF THE INVENTION

The present invention generally relates to media over Internet protocol (MoIP) networks and more particularly to apparatuses and methods for routing voice over an IP (VoIP) network while considering quality of service requirements. The invention relates more specifically to methods and apparatus providing an overlay network for voice over Internet Protocol applications.

BACKGROUND OF THE INVENTION

Voice over Internet protocol (VoIP) refers to the ability to transmit voice signals over computer networks using the Internet protocol (IP). Voice signals are first digitized to transform the analog input into a stream of digital data. Such data may or may not be compressed, as may be required by the specifics of the system being used and the capabilities it offers. The data, whether compressed or uncompressed, is then transmitted over an IP network by first formatting the voice data stream into multiple discrete packets. In a VoIP call, an originating voice endpoint quantizes an input audio stream into packets that are placed onto an IP network and routed to a destination voice endpoint using standard IP routing techniques. The destination voice endpoint restores packets into a digital audio stream that resembles the input audio stream. Compression and decompression of voice is done by using a codec (coder/decoder) implemented in hardware, software or combinations thereof, algorithms which are applied on the quantized digital audio stream to reduce the communication bandwidth required while transmitting, and restore the compressed data when receiving.

FIG. 1 is a block diagram of an example VoIP network 100. Network 100 consists of points of presence (PoPs) 110-1 and 110-2, voice endpoints 120-1 and 120-2 (also termed "voice gateways"), and IP network 130. Voice endpoints 120-1, 120-2 are the convergence points of VoIP network 100 and provide an interface between the packet side of IP network 130 and switch 140, as further explained below. Voice endpoints 120-1, 120-2, transform voice streams into packets that are placed onto IP network 130. Packets are routed to a destination endpoint 120-2. Destination endpoint 120-2 transforms the packets back to a voice data stream.

PoPs 110-1 and 110-2 include standard telecommunication switches 140, which may include but are not limited to Class 5 Switches or others used in the conventional public switched telephone network (PSTN). Switches 140 receive various voice and voice-like sources, including but not limited to voice telephone calls, analog modem communication, and facsimile (fax) transmissions.

IP network 130 includes routers 132-1, 132-2, 132-N, which are capable of transferring packets according to TCP/IP protocols. These routers are not configured to perform or capable of performing quality of service (QoS) measurements, or control packet traffic. When transferring a voice call through a certain path in network 100, if a router 132-1 determines that the path is overloaded, then there are no options to reroute the voice call through an alternative path during the voice call session. In order to reroute a voice call to different path, there is a need to change the routing table in one or more of the routers 132-1, 132-2, 132-N.

Packet flows that are transmitted as part of VoIP service are well known to be highly sensitive to latency, jitter, loss, congestion, and other qualitative characteristics of the network. VoIP networks are based on existing IP networks and therefore cannot guarantee the quality level required for such services. More specifically, this inability is a result of limitations in the original IP network architecture, which was designed for the efficient transmission of data but with little to no consideration for real-time applications, i.e., applications such as voice where timely delivery of packets of data is paramount.

In order to provide better VoIP services, IP network technology must be improved in areas such as latency, disconnected calls, network congestion, packet loss and the limited control over the network. It would be advantageous to provide solutions that resolve the problems with IP network quality in a manner that would allow the use of the vast infrastructure already existing. Moreover, such a solution should also be able to efficiently and effectively transfer audio, video or any stream of data over an existing IP network.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY OF THE INVENTION

The foregoing needs, and other needs and objects that will become apparent for the following description, are achieved in the present invention, which comprises, in one aspect, a system and method for transferring Media over IP (MoIP) packets over an overlay network. The system provides specially designed overlay network units located at key points in the IP network effectively creating an overlay network that is capable of interacting both on the overlay level as well as over the standard IP network.

In one aspect, a network for transferring multimedia over Internet protocol (MoIP) packets is provided. The network comprises at least two points of presence (PoPs) that are communicatively coupled to one another by a packet network; an overlay network capable of routing said MoIP packets and comprising a plurality of overlay network units (ONU), wherein at least one of the ONUs is communicatively coupled to said packet network; and in each of the ONUs, a packet forwarding mechanism for determining a packet next destination.

In another aspect, an overlay network unit (ONU) for an overlay network is provided, wherein the overlay network comprises one or more overlay network units (ONUs) that are communicatively coupled with one another in association with a packet network. Each ONU comprises means for communication with a packet network; means, coupled to the communication means, for receiving multimedia over Internet protocol (MoIP) packets from a source in the packet network; means, coupled to the receiving means, for sending MoIP packets over said overlay network to reach a destination in the packet network; and a label-switching table that is coupled to the sending means.

In yet another aspect, a method for communicating between overlay network units (ONUs) over an overlay network is provided, in which the method comprises accepting MoIP packets; and forwarding MoIP packets over said overlay network.

In still another aspect, a computer software product for communicating between an overlay network ramp (ONR) and an overlay network unit (ONU) over an overlay network is provided. The software product comprises one or more sequences of software instructions which, when executed by one or more processors, cause the one or more processors to carry out the steps of accepting MoIP packets; determining if said MoIP packets are to be routed through said overlay network and if not routing said MoIP packets over said switched packet network; selecting a routing method for MoIP packets; and forwarding MoIP packets over said overlay network.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus providing an overlay network for voice over Internet Protocol applications is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

As used herein, the term "multimedia over IP (MoIP) packets" describes packets to be sent over the overlay network. MoIP packets may be data packets, voice over IP (VoIP) packets, multimedia packets, and the like. As used herein, the term "overlay network ramp" or "ONR" describes a network unit located at a point of presence (PoP), capable of classifying MoIP packets and putting them onto an overlay network, the operation of which is detailed below. As used herein, the term "overlay network deflector" or "OND" describes a network unit located at various network locations, capable of receiving MoIP packets from an overlay network unit (ONU) and forward them to another ONU or a final destination, the operation of which is detailed below. As used herein, the term "overlay network unit" or "ONU" describes any one of the network units connecting the overlay network, i.e., anyone of the ONRs and ONDs connecting the overlay network. An ONU may further be capable of receiving packets from other network elements, appropriately configured, as explained herein below.

The invention includes a system and a method that enables improved communication over existing Internet protocol (IP) based networks. The concept of the invention is realized through unique, specially designed routers that are fully compatible with existing components of IP networks. These unique routers provide a means for controlling traffic over the network, and therefore improve quality of service (QoS), latency and bandwidth availability. The specially designed routers are located at key points within an IP network, effectively creating an overlay network that is capable of interacting both on the overlay level as well as over the standard IP network.

Figure 2:
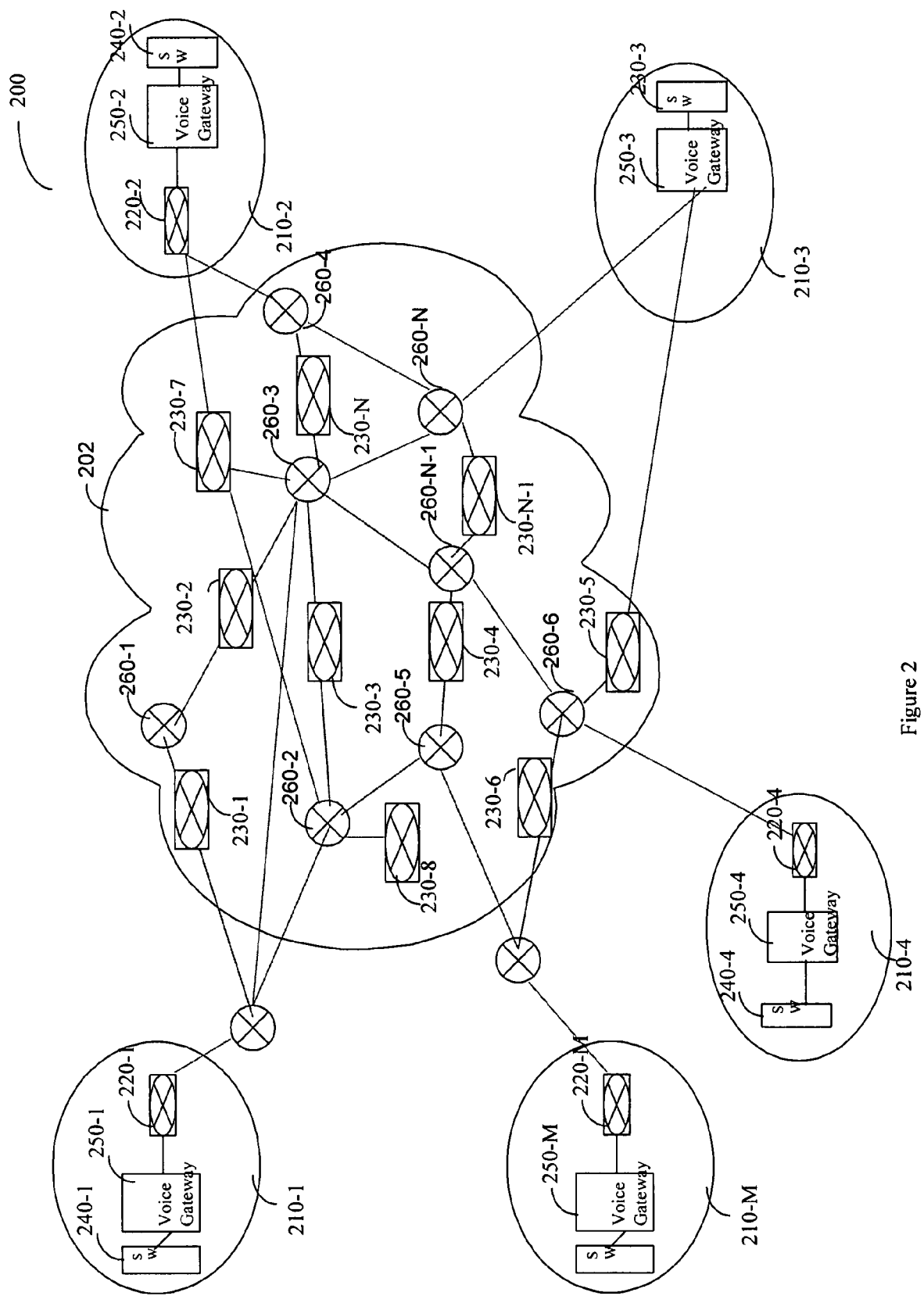
FIG. 2 is a block diagram providing an example illustration of an overlay network.

FIG. 2 is a block diagram providing an illustration of an example overlay network 200. Network 200 consists of one or more overlay network ramps (ONRs) 220-1 through 220-M located in one or more different network points of presence (PoPs) 210-1 through 210-M. Each PoP includes one or more telecommunication switches 240 and a voice endpoint 250, which can route packetized voice traffic to end users wishing to perform voice or audio based communication over the network. Network 200 also includes one or more overlay network deflectors (ONDs) 230-1 through 230-N. In general, ONDs are located within an IP network 202. One or more conventional packet routers 260-1 through 260-N are within network 202 and are communicatively coupled to the points of presence. Each OND is communicatively coupled to or associated with at least one of the conventional packet routers 260.

ONRs 210 link between voice endpoints and a wide area network (WAN) router, and are typically located within the PoPs. ONRs 210 are capable of recognizing and routing voice calls using the overlay network, explained in more detail below. ONDs 230 link between a source ONR, for example ONR 220-1, one or more ONDs, and terminate at a destination ONU, such as ONR 220-3. Thus, each OND 230 is communicatively coupled to an ONR 210 or to another OND 230. ONDs 230 route voice calls by actively determining a path to be used through network 202. Collectively ONRs 220 and ONDs 230 will be referred to herein as overlay routers.

Overlay routers are connected through common communication means such as fast Ethernet, infiBand, LAN, WAN, or otherwise other commonly used interfaces. A path between overlay routers may include connections to or through standard routers, endpoints, servers, and the like, serving the purpose of routing packets via a standard IP network. The last ONU in an overlay path sends the original MoIP packet to the final destination originally identified in a header of the packet.

Packets are routed in overlay network 200 using a control plane and a forwarding plane. In the control plane, the paths to be used in overlay network 200 are determined as well as configuration of the forwarding plane. Paths may be determined manually, by specifying the IP addresses of each ONU within the path. The configuration information may be kept in a label-switching table, an example of which is a through list, or in an access list, further explained below. A switching table may have information mapping a source ONU and an incoming label to the next ONU and the outgoing label to be used. An access control list (ACL) defines the parameters of the connection associated with a next OND and an associated label. An ACL is used by an ONR to determine, based on various parameters included in the packet, such as IP addresses, port numbers, DSCP value, etc., whether to forward the packet to an OND, and if so, which one. Thus, the ONR serves conceptually as an "on ramp" to an overlay network consisting of ONRs and ONDs.

Alternatively, paths may be determined automatically based on one or more path calculation algorithms. Path calculation algorithms determine communication paths by routing packets through the overlay network. Examples of such methods include the multi-protocol label switching (MPLS) protocol which uses various label distribution protocols (e.g. LDP, or RSVP-TE), or any other routing protocols that can be altered to run over the overlay network.

Paths also may be set based on QoS measurements, for example by using QoS for path selection. QoS-based path selection algorithms may assign paths based on QoS measurements obtained from links in prospective paths, such as packet loss, jitter, latency and so on. Such path selection algorithms can continuously collect QoS measurements from all of possible or available overlay paths. The algorithm may then mark valid paths as paths that achieve a QoS score exceeding a given threshold. The QoS threshold may be the result of a plurality of QoS parameters. The QoS threshold may be defined by a system administrator or calculated by the algorithm. For example, a QoS threshold may be the average or weighted average of the results of the measurements performed. Using the collected QoS measurements and QoS threshold, the selection algorithm prioritizes the existing paths from worst to best, based on QoS measurements.

Typically, routes in an overlay network 200 can be configured in two different ways for distribution of packets over a network, in either as source-to-destination or hop-by-hop, both of which are explained in more detail below. In the forwarding plane packets are routed between ONDs using the pre-provisioned lists and by means of label switching, using which may comprise a forwarding mechanism. Each packet is assigned a label by an ONR; subsequent ONDs examine the label, determine which egress interface to forward the packet on based on a label-switching table that maps labels to next ONU, and forward the packet according to the result of the determination.

A person skilled in the art can easily implement alternative paths' configuration algorithms to define the paths to be used in the overlay network. Thus, in this context, an access list, label switching table, and interconnect map are merely examples of various means for determining a next overlay network device to which a packet is forwarded.

The through list and the access list may include one or more predefined policies or calculated forwarding information (e.g., one or more label switching tables) targeted towards achieving optimal network traffic. These policies are sets of rules that can be defined manually or automatically. The defined polices are stored in memory in each of the overlay routers.

ONRs 220 also include traffic-engineering maps used for rerouting of voice packets through ONDs. Each traffic-engineering map includes an access list and a through list. The access list is used for filtering of the incoming voice packets. The access list includes one or more rules that may define the allowed source IP addresses and ports along with the designated destination IP addresses. The through list defines various paths that may be used for rerouting MoIP packets. Paths are prioritized and whenever a chosen path is overloaded, or is not available, or does not match any other criteria, ONR 220 selects, from the through list, the next available path. Such selection can be done in various ways, such as least recently used, round robin, weighted round robin, random, least loaded path, or any other applicable method.

ONDs 230 also contain an interconnect map that is used for rerouting MoIP packets between overlay routers and includes a list of various paths to be used and a list of destination overlay routers. Thus, the interconnect map provides a data representation of the topology of the overlay network.

Each overlay router periodically exchanges messages with its neighbor overlay routers to ensure that it is functioning correctly. The checks may include, but are not limited to, QoS measurements messages, status messages, keep-alive messages, routing info and so on. "Neighbor" overlay routers are two overlay routers that are logically linked together over the overlay network. Links between neighbors may include direct connections or indirect connections to or through standard routers, endpoints, servers, and the like, all serving the purpose of routing packets via a standard IP network.

Neighborhood relationships between overlay routers may be configured manually by the system administrator. Alternatively, configuration may be done automatically using multicast protocols, or using a central database that includes a list of available overlay routers. Overlay routers may also configure themselves with information identifying their neighbors while sending voice packets to another overlay router. For example, when an overlay router receives diagnostic packets from a previously unknown overlay router, it registers that overlay router as its neighbor. Path QoS measurements are an aggregation of QoS measurements between neighboring overlay routers within that path.

MoIP packets may be directed to overlay network 200 without using an ONR 220. In order to transfer MoIP packets in such a way, for example, call setup messages are passed through various MoIP devices as necessary. These devices include, but are not limited to, a softswitch, gatekeeper, and other call control elements. These devices can modify the signaling messages and make the endpoints direct the MoIP packets to go to one of the ONDs directly. That first OND can communicate with the call control element and transfer that call onto the overlay network. As an example, a possible path from PoP 210-3 to destination ONR 220-M includes voice endpoint 250-3 to OND 230-5 to OND 230-6 and to destination ONR 220-M.

Figure 3A:
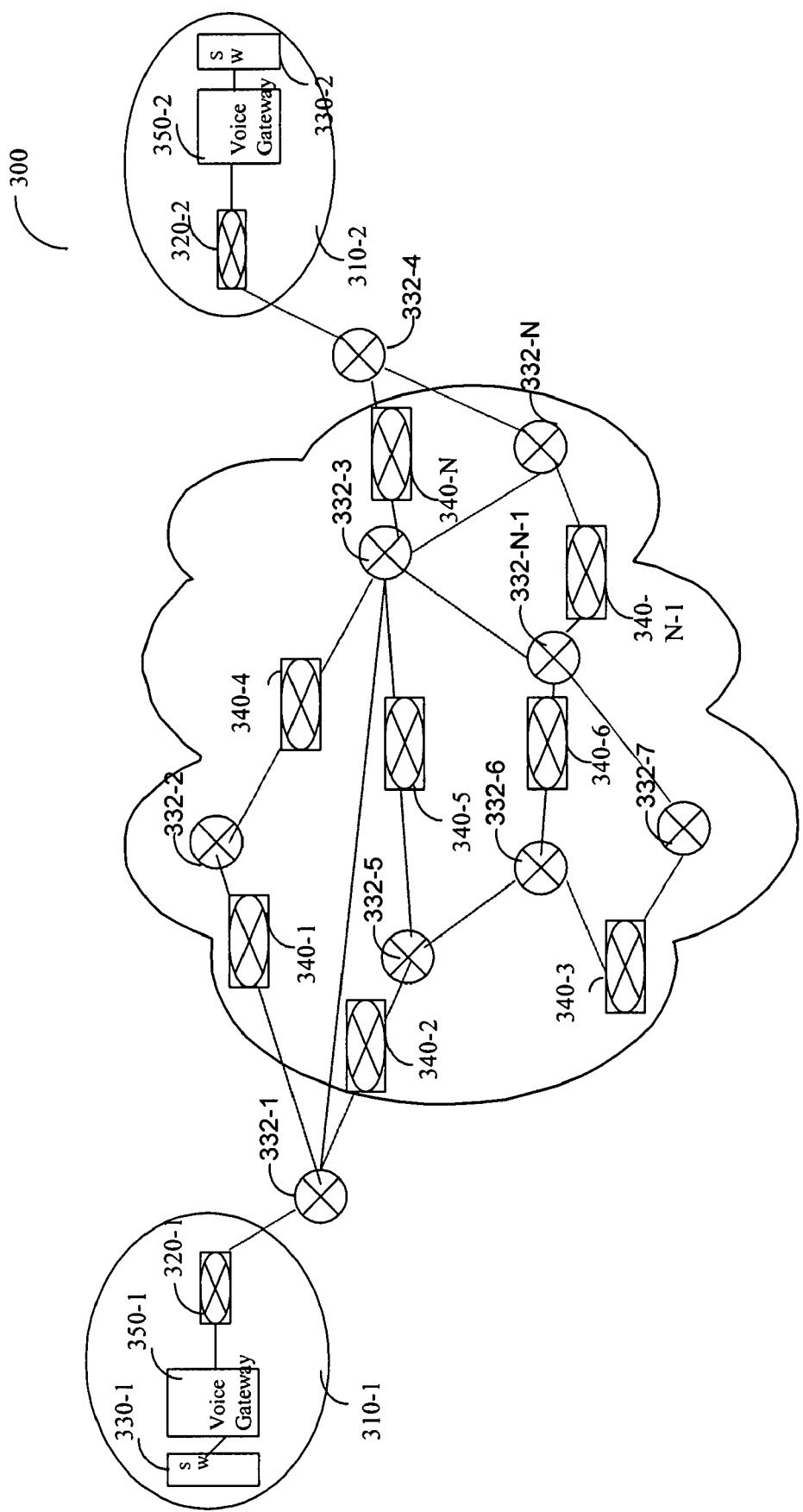
FIG. 3A is a block diagram providing an example illustration of an overlay network consisting of multiple source-to-destination paths.

FIG. 3A is a block diagram providing an illustration of an example overlay network 300 consisting of a multiple source-to-destination paths. Network 300 comprises ONRs 320-1 and 320-2 located in source PoPs 310-1 and destination PoP 310-2 respectively. Each PoP 310 includes one or more telecommunication switches 330 and voice gateways or endpoints 350. Network 300 also consists of one or more ONDs 340-1 through 340-N.

Each path between source ONR 320-1 and destination ONR 320-2 includes at least one OND 340 and may include one or more direct or indirect connections to or through standard routers, endpoints, servers, and the likes, serving the purpose of routing packets via a standard IP network. Paths in overlay network 300 can be defined using multi protocol label switching (MPLS), or any of the various label distribution protocols. Source-to-destination paths are stored in memory in a through list that is located within ONDs 340. Through lists define and prioritize the available paths from a specified source to a specified destination.

Each path in the through list is defined by using a unique label used for the forwarding decisions. By assigning each MoIP packet a label, packets are routed through the designated source-to-destination paths. If MPLS is not supported by the underlying network, then tunneling protocols may be used. In that case, the encapsulated label is stored within the encapsulated packet and is not a real MPLS label. More specifically, when a packet is tunneled towards the next hop, the packet encapsulation further includes the label to be used by the next hop device.

Examples for possible paths from source ONR 320-1 to destination ONR 320-2 include: a) source router 320-1 to OND 340-1 to OND 340-4 to OND 340-N and to destination ONR 320-2; or b) source router 320-1 to OND 340-2 to OND 340-5 to OND 340-N and to destination ONR 320-2. Thus, unlike prior other IP implementations, the present approach can create multi-paths for routing packets instead of only a single path, as provided in the prior approaches.

Voice traffic can be transferred between PoPs 310-1 and 310-2 without passing through ONDs 340. However, during peak load periods the designated path might result in degradation of QoS. In such cases, the approach herein provides an option of rerouting traffic through overlay routers. By rerouting voice traffic, it is possible to avoid the congested designated path between PoPs 310-1 and 310-2.

Figure 3B:
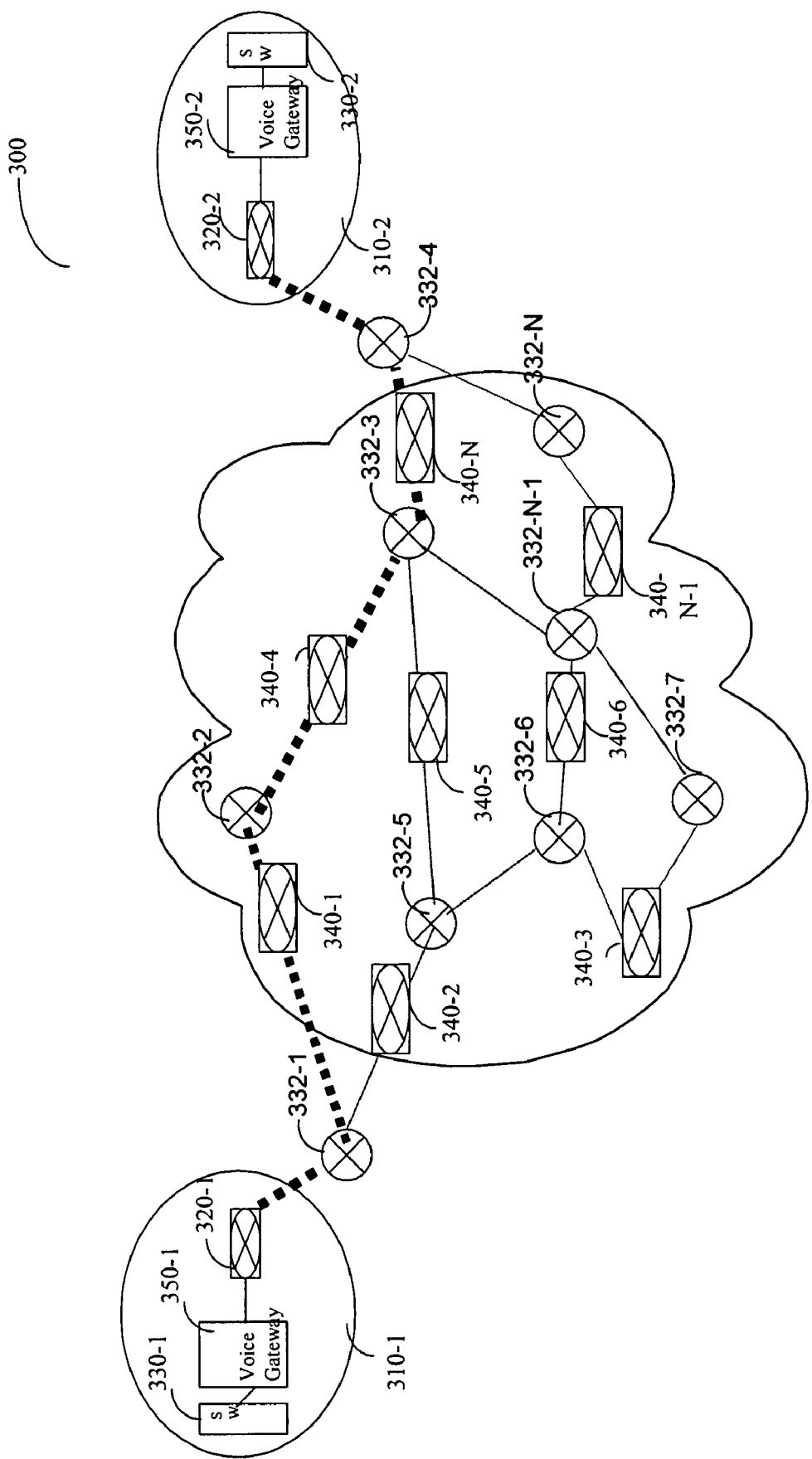
FIG. 3B is a block diagram of the overlay network of FIG. 3A showing a first selected path.

In order to reroute traffic, ONR 320-1 selects a source-to-destination path from among the available paths in network 300. Paths are selected according to their priorities and direction to ensure reasonable load balancing. Next, ONR 320-1 transfers the MoIP packets of the call through the chosen path. FIG. 3B illustrates an example of a selected path that passes through ONR 320-1, conventional router 332-1, OND 340-1, router 332-2, OND 340-4, router 332-3, OND 340-N, router 332-4, and ONR 320-2.

Figure 3C:
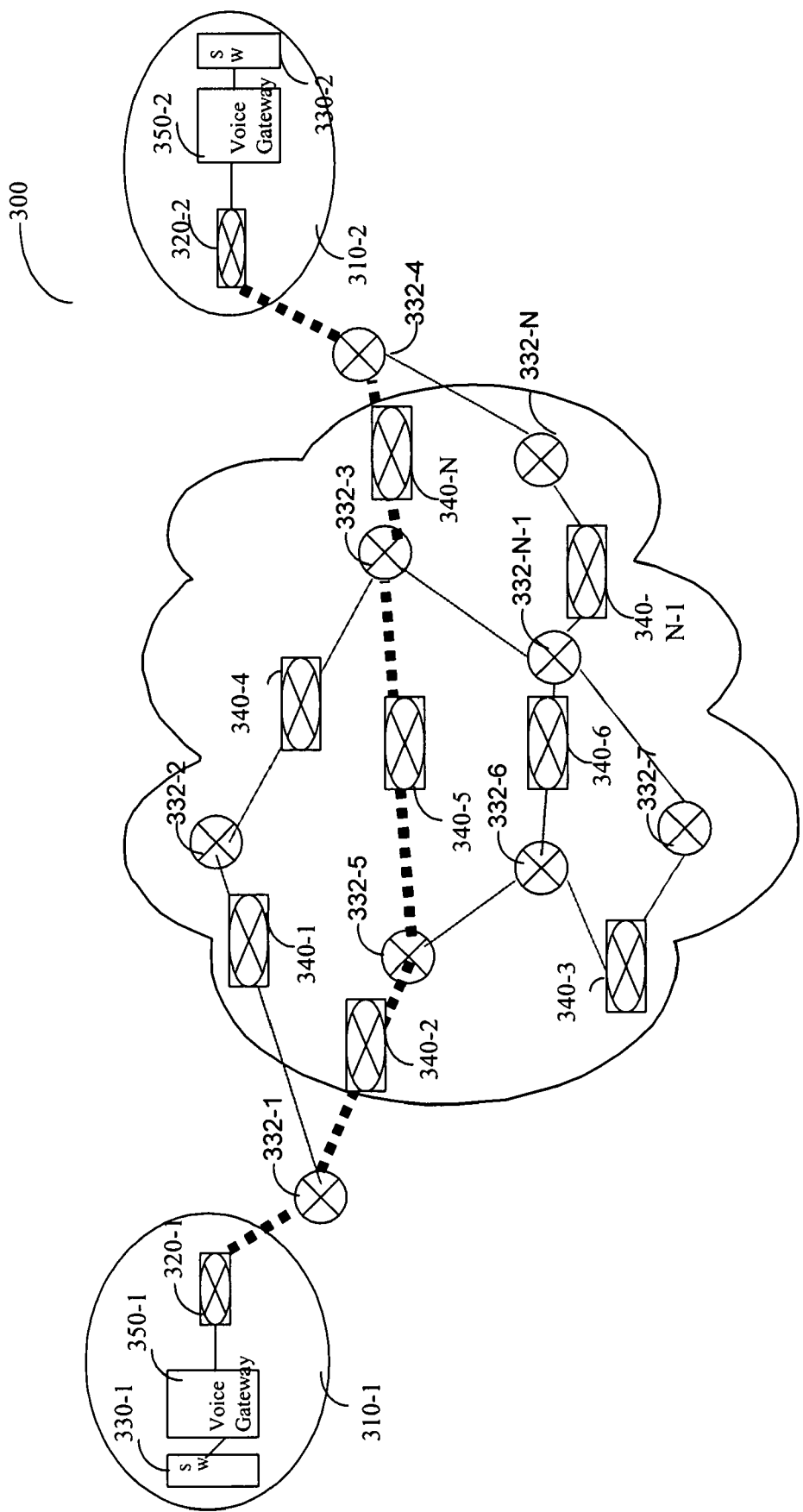
FIG. 3C is a block diagram of the overlay network of FIG. 3A showing an alternate selected path.

MoIP packets are routed through the chosen source-to-destination path by affixing to each packet a specific label indicating the addresses of overlay routers that are participating in the chosen path. In one embodiment, source ONR 320-1 is responsible to affix such labels to the MoIP packets. If a source-to-destination path is lost due to network failure or bad QoS measurements, ONR 320-1 automatically reroutes traffic to the next path, selected from its through list, based on the priority of paths in the list. This selection can be done in various ways such as round robin, weighted round robin, least recently used, and the like. FIG. 3C is a block diagram showing an example of an alternative path. In this example, MoIP packets are routed from source router 320-1 to destination ONR 320-2 through conventional router 332-1, OND 340-2, router 332-2, OND 340-5, router 332-3, OND 340-N, and router 332-4.

Figure 4A:
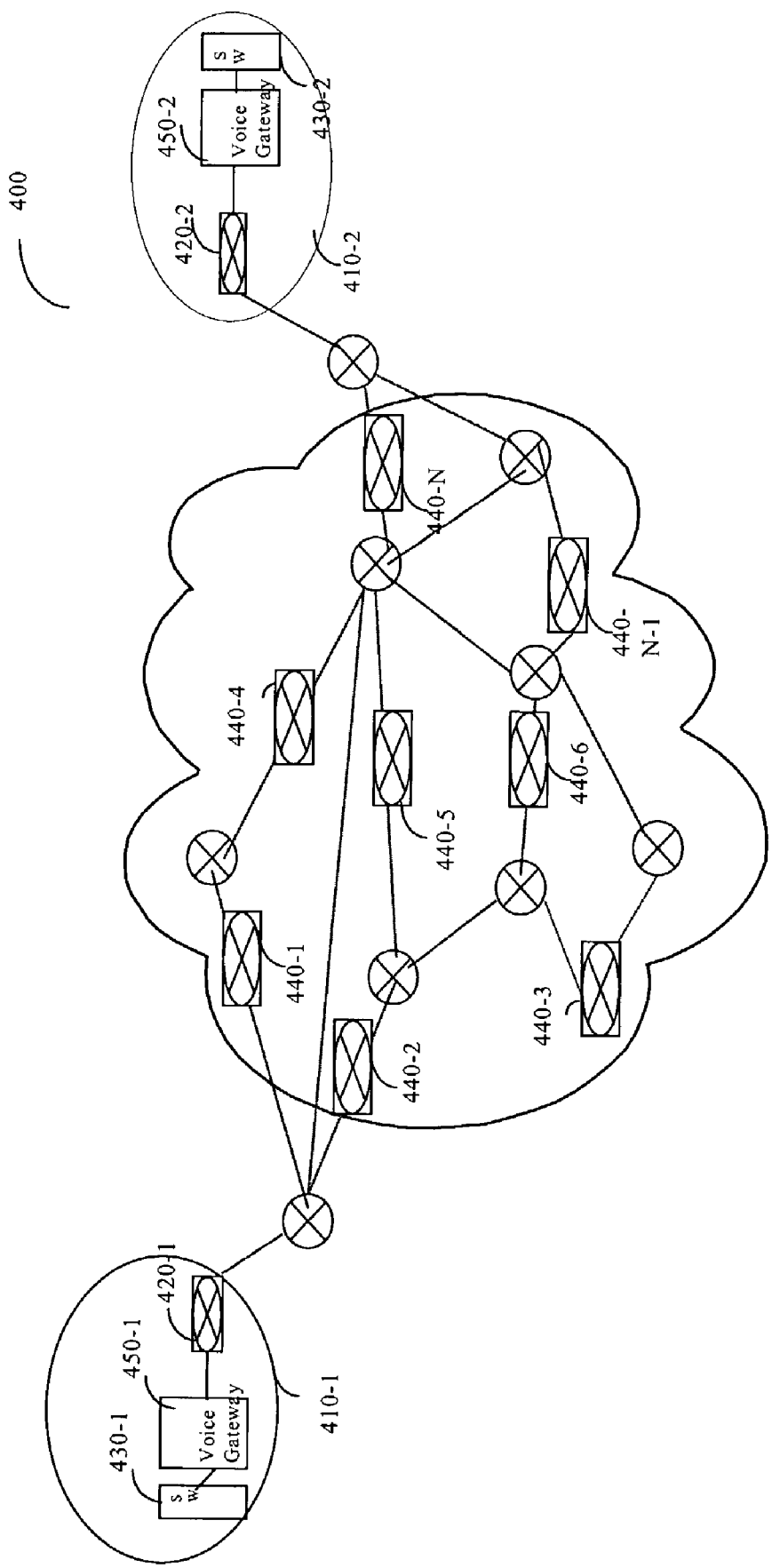
FIG. 4A is a block diagram providing an example illustration of an overlay network consisting of multiple hop-by-hop paths.

FIG. 4A is a block diagram showing an example illustration of an overlay network 400 consisting of multiple overlay routers configured to perform packet routing on a hop-by-hop basis. In this context, a hop may be an ONR, OND, or any device used for routing MoIP packets. A hop-by-hop path selection enables each overlay router in a path to select the immediately following overlay router destined to receive the MoIP packets.

Network 400 comprises ONRs 420-1 and 420-2 located in source PoP 410-1 and destination PoP 410-2 respectively. Each PoP includes one or more switches 430 and voice endpoint 450. Network 400 further consists of N ONDs 440-1 through 440-N. Hop-by-hop paths in overlay network 400 are set manually by specifying, for each overlay router, its destination overlay router. This information is kept in the interconnect map that is stored in memory in each of the overlay routers. Each path in network 400 includes a source ONR 420-1, a destination ONR 420-2 and at least one OND 440. A path may also include direct or indirect connections to or through standard routers, endpoints, servers, and the like, serving the purpose of routing packets via a standard IP network.

In network 400, voice traffic can pass directly between PoPs 410-1 and 410-2 through the regular IP network. However, when peak load periods are experienced, overload in the designated path may occur, resulting in deteriorated QoS. In such a case, the approaches herein provide an option for rerouting voice traffic through overlay routers. Each overlay router transfers MoIP packets to another overlay router according to the definitions in the interconnect map of each overlay router.

Figure 4B:
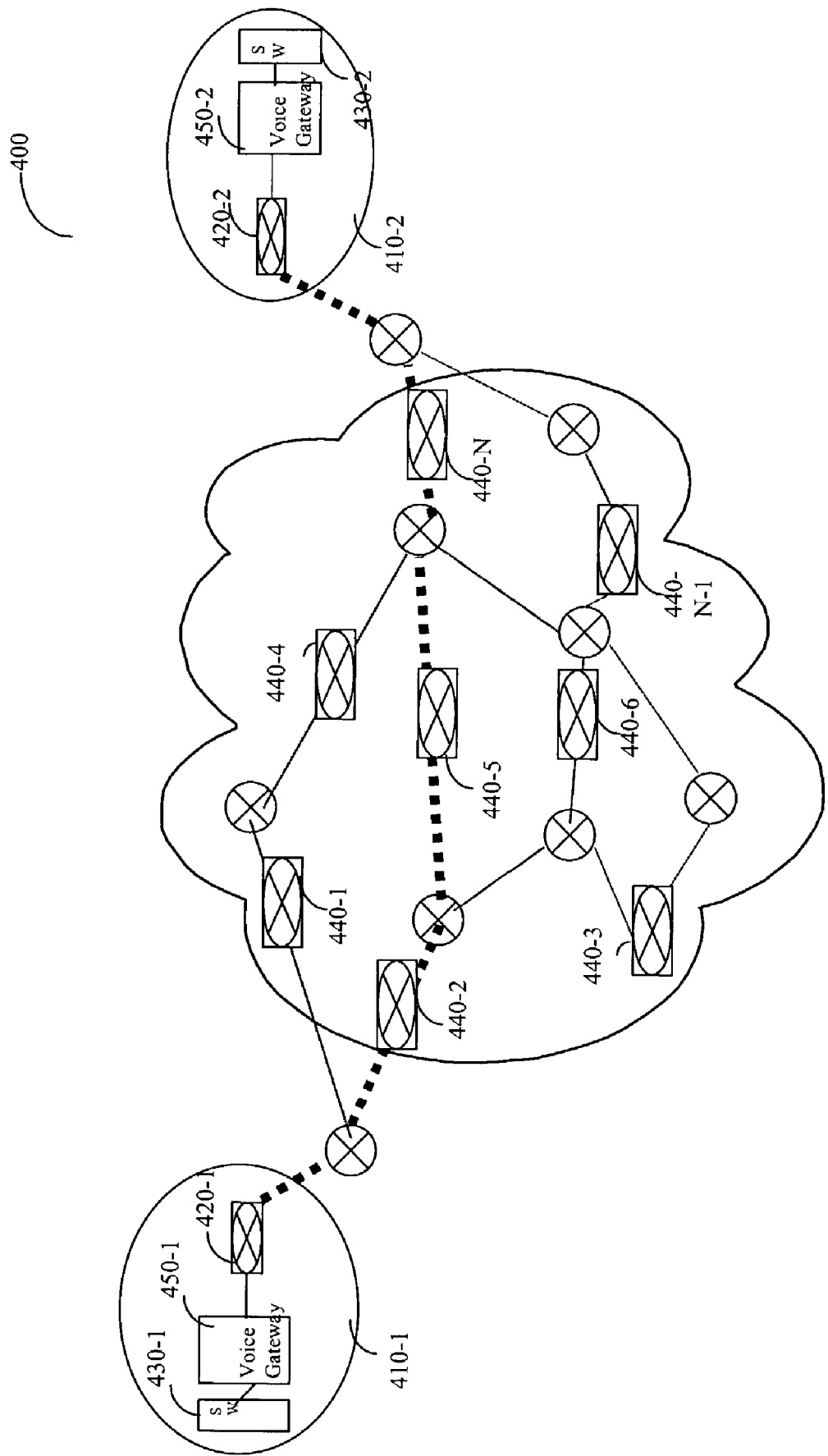
FIG. 4B is a block diagram of the overlay network of FIG. 4A showing a first selected path.
Figure 4C:
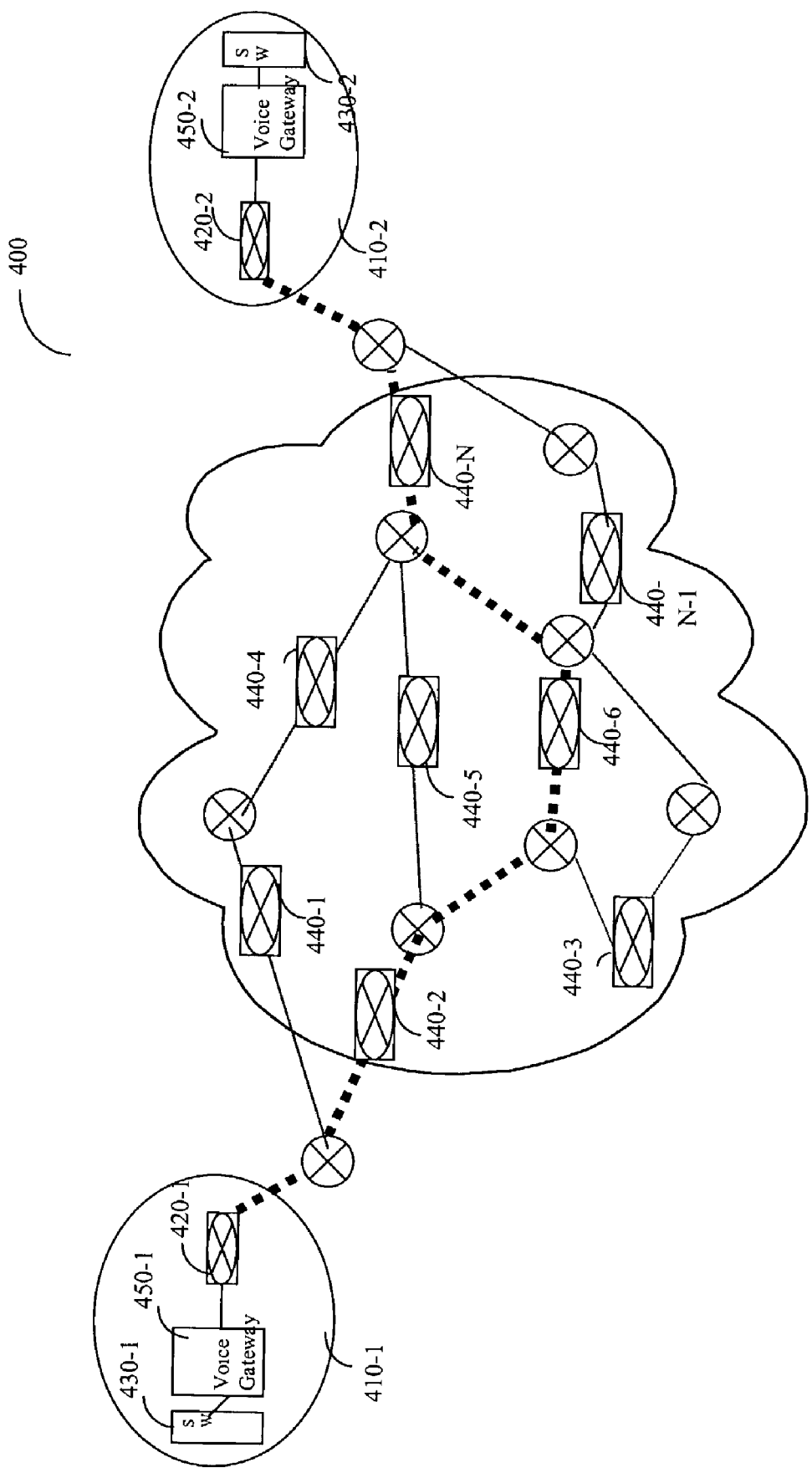
FIG. 4C is a block diagram of the overlay network of FIG. 4A showing an alternate selected path.

FIG. 4B is a block diagram of the network of FIG. 4A showing an example of a hop-by-hop path. In the example path, ONR 420-1 transfers MoIP packets to OND 440-1, which transfers them to OND 440-5, which in turns forwards the MoIP packets to ONR 420-2. Another path may be used if, for example, the connection with router 440-5 is lost, or low QoS is determined. OND 440-1 may reroute the call through another OND, defined in its interconnected map, for example router 440-6. This example alternative selected path is illustrated in FIG. 4C.

Figure 5:
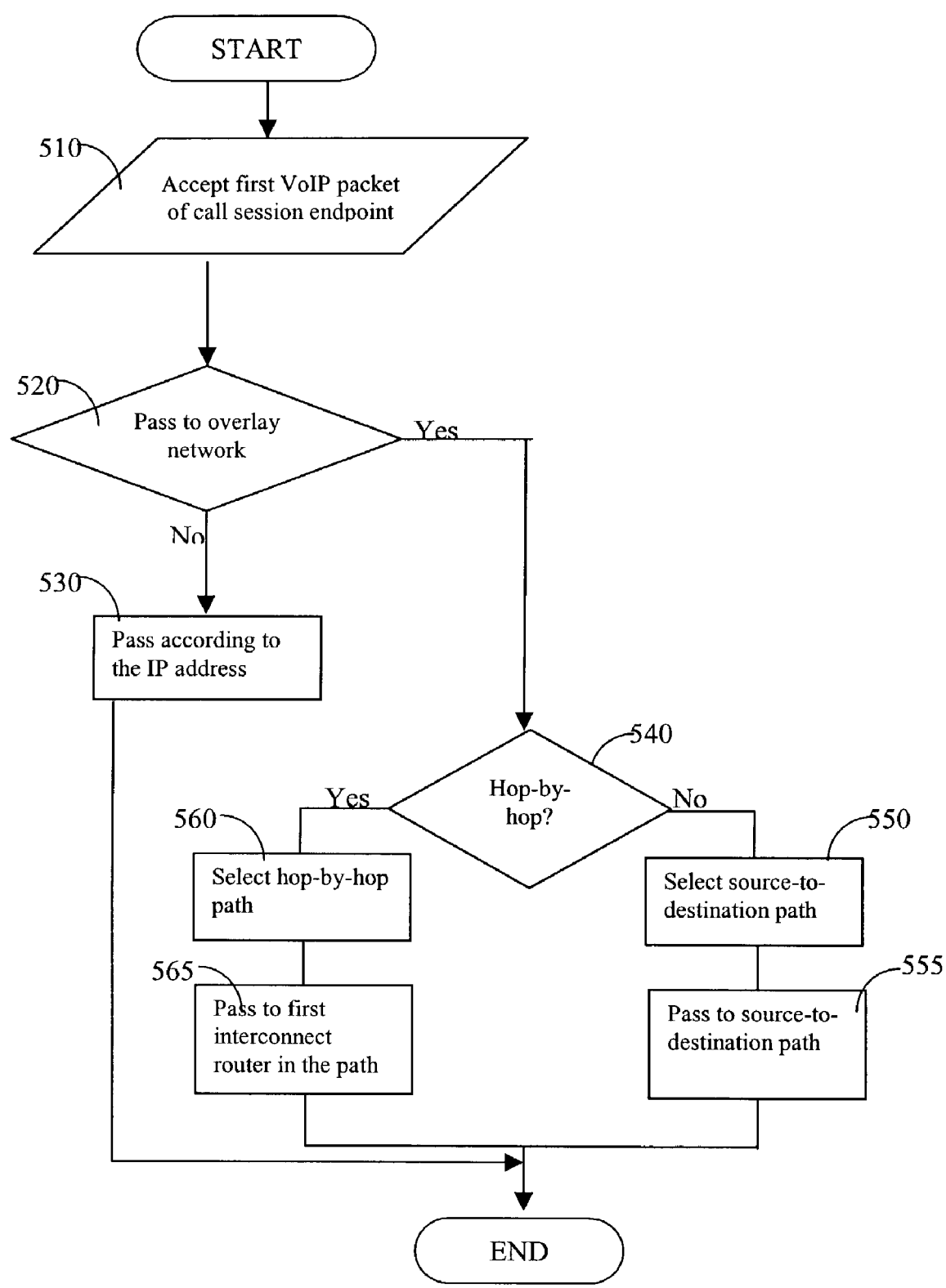
FIG. 5 is a flow chart providing an example of a method for routing MoIP packets from an overlay network ramp.

FIG. 5 is a flow chart illustrating an example process for routing MoIP packets through the overlay network from ONR.

In step 510, ONR 220-1 receives voice calls form voice endpoint 260-1. Calls are received as streams of MoIP packets including source and destination IP addresses. ONR 220-1 can use various methods to identify a stream as a voice media stream. ONR 220-1 may parse the call setup messages and track the call state. Call setup awareness enables ONR 220-1 to identify the status of the call at every moment, the port numbers where the media stream is going to take place, etc.

Media streams can also be identified using various heuristics. As an example, in one of the heuristics, ONR 220-1 extracts the length of the user datagram protocol (UDP) packets, and according to that length, ONR 220-1 determines if the incoming stream is media stream. In addition, ONR 220-1 can examine the difference between consecutive packets. Based on this difference value, ONR 220-1 determines if those packets match the real-time transport protocol (RTP). It is further possible to begin the routing of packets by ONR 220-1 at any stage of the call, including but not limited to changing the routing decision during the call.

In step 520, ONR 210-1 determines if a call should be transferred through overlay network 200, based upon MoIP packet source address, destination address, and/or other relevant parameters.

If a call should not be transferred via overlay network 200, then that call is passed to the IP network, in step 530, with no changes. In the case where the MoIP packets match any of the access list entries it is determined that the call is to be passed using overlay network 200.

In step 540 ONR 220-1 determines if a call should transfer via a source-to-destination path or through a hop-by-hop path. In the case where the MoIP packets are to be passed through a source-to-destination path, then in step 550 ONR 220-1 may select a path with the highest priority from the through list. The selection is further made by attempting to ensure reasonable load balancing between the relevant paths.

In step 555, ONR 210-1 sends all of the MoIP packets associated with the call to overlay network 200 through the specified source-to-destination path by affixing to each MoIP packet a unique label indicating the OND 240 within that path. In the case where MoIP packets are to be passed through hop-by-hop path, then in step 560 ONR 220-1 may select the first OND 240 to which MoIP packets of a call will be sent. In step 565, ONR 210-1 passes MoIP packets to the first OND 240 within the hop-by-hop path.

Voice packets are routed between ONDs 220, using tunneling protocols, such as layer two tunneling protocol (L2TP), generic routing encapsulation (GRE), point to point tunneling protocol (PPTP), or any type of standard or proprietary tunneling protocol that can support the operation of overlay networks. Tunneling protocols typically wrap voice packets for the purpose of routing the packets through specific routers, without enabling the specific routers to modify the packets. Wrapping packets is done by affixing one or more bytes to each packet indicating the destination address of the overlay router. A specific example may be found in co-pending application Ser. No. 09/775,274, filed Jan. 31, 2001, now U.S. Pat. No. 7,002,993, entitled "A Method and Apparatus Providing Media Aggregation in a Packet-Switched Network", commonly assigned to the assignee hereof, the entire contents of which is hereby incorporated by reference for all purposes as if fully set forth herein.

Figure 6:
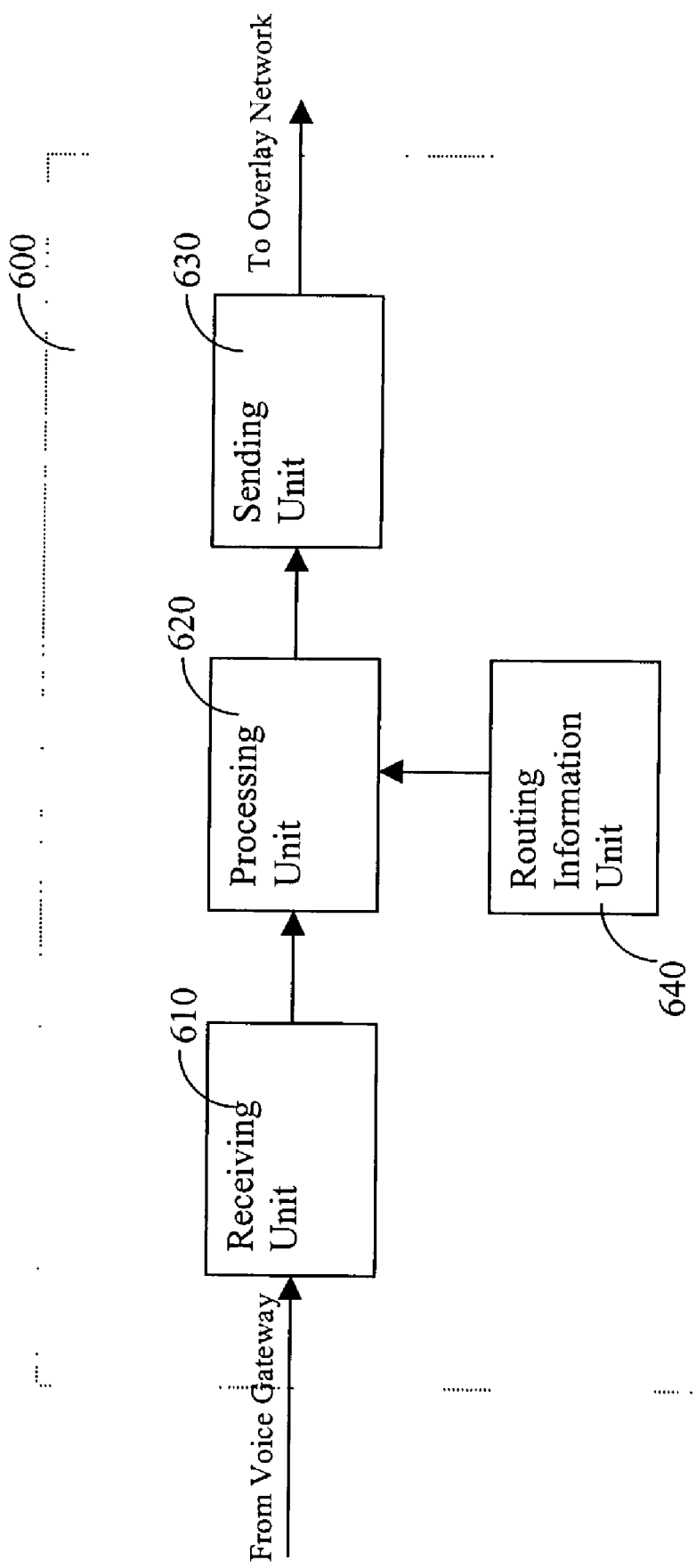
FIG. 6 is a block diagram of an example of a logical structure of an overlay network ramp.

FIG. 6 is a block diagram of a logical structure of an ONR. An ONR 600 comprises a receiving unit 610, processing unit 620, sending unit 630, and routing information unit 640. Receiving unit 610 is capable of receiving MoIP packets coming from a voice gateway. Processing unit 620 accepts the received MoIP packets, and determines whether to transfer them through the network on a source-to-destination path or hop-by-hop path. Additionally, according to the content of routing tables 640, processing unit 620 decides what is the next ONU to which ONR 600 should transfer packets. Using that information, sending unit 640 sends the MoIP packets to the next ONU. Routing information 640 includes the access list and the label-switching table. These tables are described in detail above.

Figure 7:
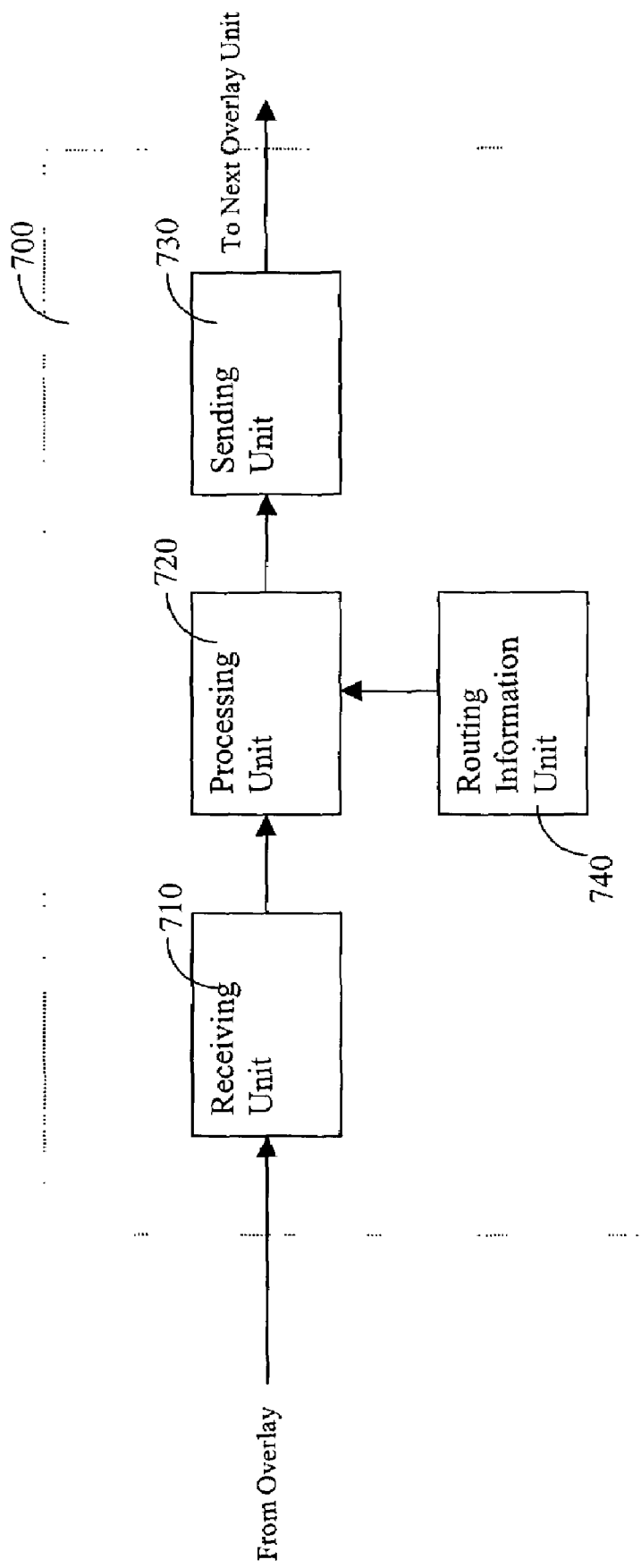
FIG. 7 is a block diagram of an example of a logical structure of an overlay network deflector.

FIG. 7 is a block diagram of an example logical structure of an overlay network deflector. An OND 700 consists of a receiving unit 710, processing unit 720, sending unit 730, and routing information unit 740. Receiving unit 710 is capable of receiving MoIP packets coming from a voice gateway. Processing unit 720 accepts the received MoIP packets, and determines, according to the routing information unit 740 content, the next ONU to which OND 700 should transfer packets. Using that information, sending unit 740 sends the MoIP packets to the next ONU. Routing information unit 740 includes only the label-switching table. This table is described in detail above.

Figure 8:
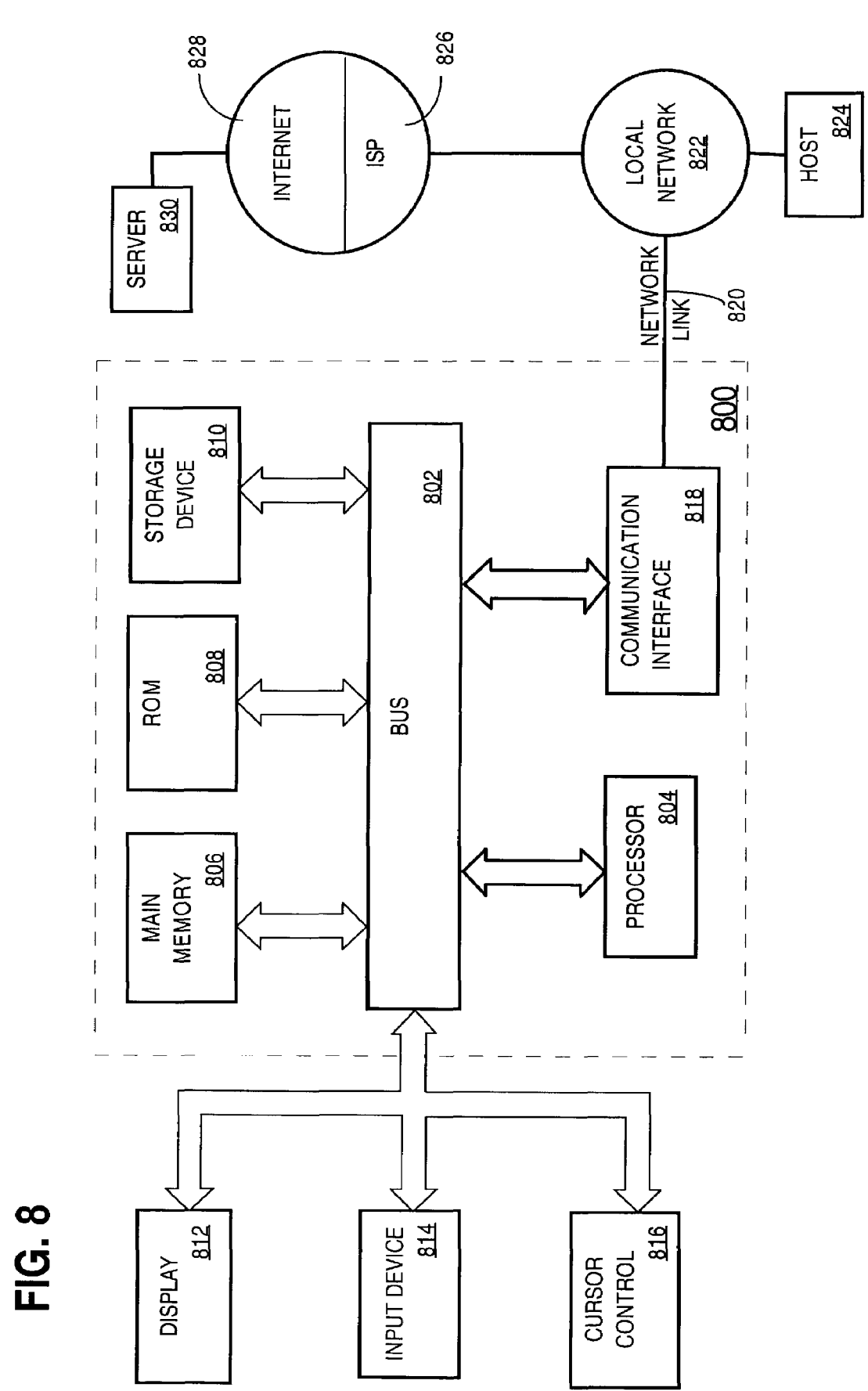
FIG. 8 is a block diagram of a computer system and computer-readable media with which certain embodiments may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory ("RAM") or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory ("ROM") 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube ("CRT"), for displaying information to a computer user. An input device 814, including alphanumeric and other keys, is coupled to bus 802 for communicating information and command selections to processor 804. Another type of user input device is cursor control 816, such as a mouse, trackball, stylus, or cursor direction keys for communicating direction information and command selections to processor 804 and for controlling cursor movement on display 812. This input device typically has two degrees of freedom in two axes, a first axis (e.g.; x) and a second axis (e.g., y), that allows the device to specify positions in a plane.

The invention is related to the use of computer system 800 for providing an overlay network for use in VoIP applications. According to one embodiment of the invention, providing an overlay network for use in VoIP applications is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector can receive the data carried in the infrared signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network ("ISDN") card or a modem to provide a data communication connection to a corresponding type of telephone line. As another example, communication interface 818 may be a local area network ("LAN") card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider ("ISP") 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for an overlay network for use in VoIP applications as described herein.

The received code may be executed by processor 804 as it is received, and/or stored in storage device 810, or other non-volatile storage for later execution. In this manner, computer system 800 may obtain application code in the form of a carrier wave. In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

As commercial traffic figures ramp up, the VoIP service providers face the same challenges that plagued the eCommerce service providers with the explosion of the Internet.

The architectural limitations of the typical eCommerce service provider network (comprised of routers, switches, WEB servers and application servers) held up the service providers from effectively scaling their service while maintaining the expected high quality of service with minimal operational costs. These gaps, in the areas of network performance, quality of service (QoS), and security were resolved in the form of specialized networking gear (such as local and distributed load balancers, cache engines, QoS boxes, firewalls and application level security boxes, etc.).

The same class of operational challenges is gradually appearing with the exponential growth of commercial VoIP traffic. Bandwidth costs; billing discrepancies; network congestion causing quality degradation; complex network management and limited control of network access—all have a direct hit on the bottom line of VoIP service providers, whereas the basic VoIP elements are inherently architecturally constrained from effectively resolving these problems.

Kagoor Networks has devised a novel approach for resolving this class of problems. By introducing a transparent, VoIP aware traffic processing platform, a wide variety of network operation related problems can be effectively resolved—without requiring any modifications to the existing IP and VoIP network infrastructure.

We first discuss the Kagoor solution architecture and technology and then show how it can be used to solve a list of operational problems.

General Overview

A Kagoor box (Kbox) is a network device acting as a transparent IP level switch (initially just a bridge between two LANs) that tracks VoIP calls and is able to perform wire-speed manipulation and measurements on three layers: the IP layer, media layer, and call signaling layer. The protocol tracking and packet processing primitives can achieve certain functional goals as described below.

The Kagoor box is equipped with two or more network interfaces (NICs) and is usually installed at a point of physical or logical discontinuity in the service provider network: either at the exit point from the Point Of Presence (POP) to the Wide Area Network (WAN), between two adjacent networks, or in strategic peering points within the network. There is at least one "inbound" interface and at least one "outbound" interface, with all the traffic flowing (bi-directionally) between inbound interfaces and outbound interfaces. The physical network interfaces can vary: Fast Ethernet, Gigabit Ethernet, ATM, Packet Over Sonet (POS), etc.

Figure 9:
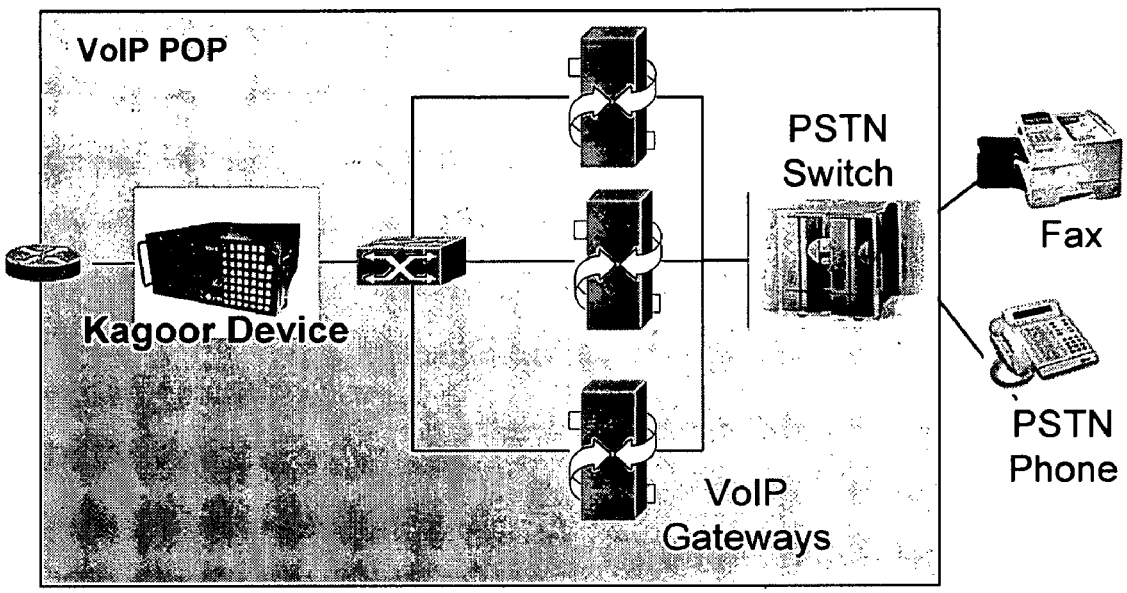
FIG. 9 is a block diagram illustrating a possible location of a network device within a VoIP POP.

FIG. 9 is a block diagram that demonstrates a possible location of a Kagoor device within a VoIP POP.

Figure 10:
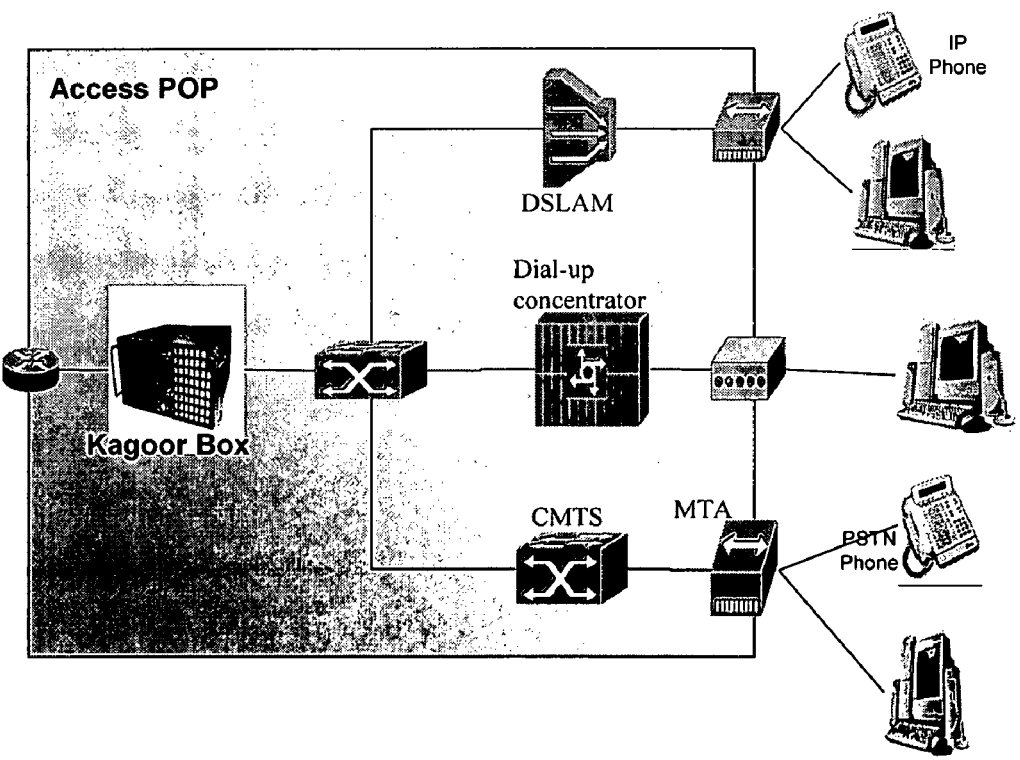
FIG. 10 is a block diagram illustrating a network diagram in which a network device is used in an access POP of an ISP.

A Kagoor box can also be used in an access POP of an ISP to support endpoints connected through various connection types such as dial-up, DSL or Cable. FIG. 10 is a block diagram illustrating a network diagram for such a POP and the Kagoor box location in it.

A web-based UI allows an easy and intuitive management of the box by directing a web browser at it. The UI serves for configuration and provisioning of the box, as well as for monitoring its status. The box can also be controlled using the SNMP protocol as well as using a command line interface (either through a serial port or through a Telnet session).

Figure 11:
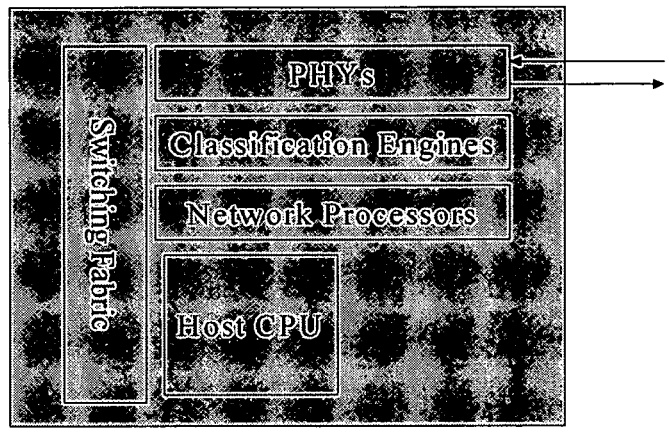
FIG. 11 is a block diagram illustrating a network device.

On the hardware side the Kagoor platform can consist of several hardware components. A general block diagram of the Kagoor device can be as shown in FIG. 11.

The PHYs are the physical interfaces through which packets or cells enter and leave the system (e.g an Ethernet or ATM transceiver). The packets go through the switching fabric which hands them to other components in the system (possibly back to the network through another PHY). Classification engines can be used to classify the traffic by extracting various fields from the packets, looking them up in pre-processed tables, and tagging the packets accordingly. The resulting tags can then also be used by the switching fabric to further hand the packets to other components in the system. Dedicated network processors can be used for various packet manipulations and to implement many of the primitives described below. The host CPU can be used for general software based functions such as deep protocol parsing, hardware management, protocols implementation, etc.

A line card architecture is also possible. Here we may have PHYs, classification engines and network processors combined on the same board which then connects to the backplane (be it a bus or switching fabric of any sort).

Note that for high availability purposes the device can be redundant in terms of power supplies, duplicate fans, duplicate host CPUs, etc. and may support hot swappability of the various components.

Architecture

The Kagoor solution is comprised of two logically separate entities: the Kagoor platform and the Kagoor applications. The Kagoor platform and Kagoor applications are described herein with reference to VoIP. It will, however, be evident that various modifications and changes may be made thereto without departing from the broader spirit and scope of the invention. The specification and drawings are, accordingly, to be regarded in an illustrative rather than a restrictive sense. The scope of the Kagoor platform and Kagoor applications includes other types of IP traffic. For example, the Kagoor platform and Kagoor applications apply, without limitation, to Video over IP and to streaming media.

Figure 12:
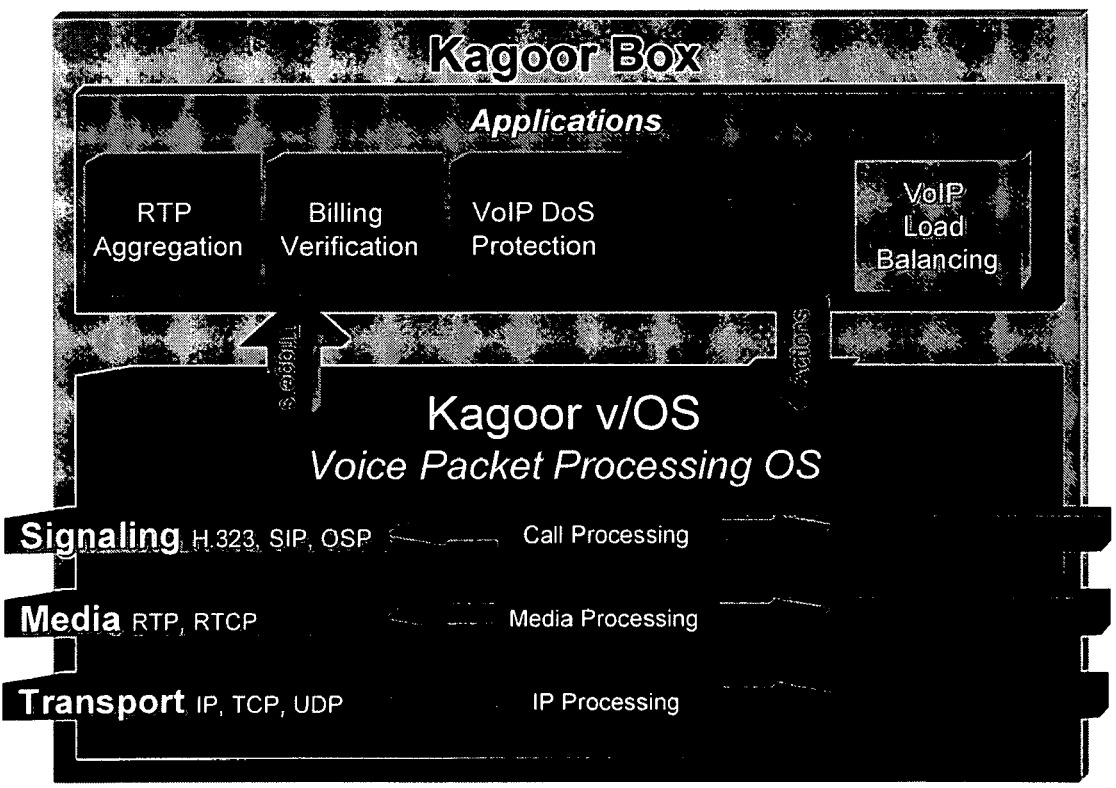
FIG. 12 is a block diagram illustrating a logical abstraction of a network device.

The Kagoor platform can be viewed as a vertical, voice specific, Policy Enforcement Point (PEP). It resides on the wire and listens to all VoIP packets going through it. The platform parses all the relevant VoIP traffic and tracks the state of each call. It creates an abstraction layer above the underlying protocols so the Kagoor applications can be written independently of the actual VoIP protocol used. It acts in three layers: the IP layer, the media layer and the signaling layer. Reference is made to FIG. 12, which is a block diagram illustrating a logical abstraction of the Kagoor box.

At each layer the platform implements a set of basic primitives which act on the actual packet streams and are performed in wire speed. Some of these primitives are:

IP Layer

Packet dropping: packets may be dropped based on various parameters in the IP header. This is useful to prevent certain media and signaling streams from entering the network and can be used by applications such as firewalls, protection against denial of service attacks, access control and others.

Packet duplication: packets may be duplicated and then sent to a new destination, either by just changing the destination IP address or by using various encapsulation protocols. This can be used by applications such as lawful interception which can direct the duplicated traffic to a real-time tapping or recording system.

Packet marking: this includes modifying the Type of Service (ToS) field or the DiffServ CodePoint (DSCP) in the IP header of the packet.

Label manipulation: a packet may be labeled when entering an MPLS domain (thus the device can serve as an MPLS gateway). Within an MPLS domain the label may be modified or a new label can be pushed/popped on top of the label stack. This can be used by traffic engineering applications.

Traffic policing: the device may enforce hard limit on bandwidth permitted to various traffic flows by either remarking or dropping any excess traffic.

Packet scheduling: the device may use various queuing mechanisms and classify the incoming packets into different queues, each with its own priority and other characteristics.

Packet re-routing: packets can be re-routed to a new destination either by simply modifying the destination IP address or by encapsulating the original packet in a new protocol.

Tunneling: packets may be encapsulated and put into tunneled flows.

Encryption: packets may be encrypted before they are sent to their destination.

Packet injection: the device can inject new packets into a given flow. This can be used by applications such as the RTP Reconstruction which is described below.

Packet compression: packets may be compressed as they traverse through the device. This include both header compression as well as general compression that includes the payload.

Media Layer

Transcoding: the codec used to carry the voice/fax media can be changed on the fly. This may be needed e.g. in cases when the two endpoints don't support the same codec types.

RTP aggregation/multiplexing/trunking: multiple packets of different RTP flows may be aggregated together on one single header provided they share a common sub-route. This can save significant amount of bandwidth.

RTP header compression: IP/UDP/RTP headers can be compressed using various header compression techniques.

Media modification: the device may decode the voice stream, modify it and re-encode it. This can be used for various applications such as ad insertion, voice announcements, etc.

Media reconstruction: dropped packets have significant effect on voice quality. Most endpoints are incapable of recovering those lost packet. The device can use innovative compressed and uncompressed media reconstruction techniques to be able to somewhat recover lost packets and improve the voice quality.

Media duplication: media streams can be duplicated in order to enable applications such as lawful interception and call logging.

Media re-routing: media streams can be re-routed to a new destination or through a given network path.

Signaling Layer

Protocol translation: the device can translate between signaling protocols or protocol flavors to facilitate the communication between incompatible endpoints.

Generate accurate Call Detail Records (CDRs) or IP Detail Records (IPDRs): by parsing the voice protocols in the three layers the device can accurately measure the exact network usage and also report mismatches between the signaling reports and the actual media sent.

Number translation: the device can make on-the-fly modifications to fields in the signaling messages thus replacing and translating those fields. One compelling primitive would allow for phone number translations for applications such as Local Number Portability (LNP).

Drop calls: calls may be dropped based on various parameters such as the caller, the callee (e.g. block certain numbers or area codes), etc. This can be used by admission and access control applications.

Perform resource reservation for a call: resource reservation can be done on behalf of incapable endpoints using protocols such as RSVP.

Call re-routing: a call may be re-routed through an alternate route using methods such as MPLS and tunneling. This may include the signaling messages in addition to the media itself.

Call redirection: this can be used by gateway load balancing applications in order to direct incoming calls to the most appropriate gateway in a gateway farm (or anywhere else in the network).

Call signaling duplication: signaling may have to be duplicated in order to enable applications such as lawful interception and call logging. Logging the signaling is necessary in order to be able to fully replay a recorded call.

Signaling aggregation (or connection re-use): a call setup may include multiple signaling protocols and connections between a pair of endpoints. Most of these protocols run over TCP and each such connection takes time to setup. By maintaining an open connection between a pair of Kagoor devices it is possible to avoid some of the connection setup delays by tunneling the signaling messages through the already opened and maintained TCP connection.

Figure 13:
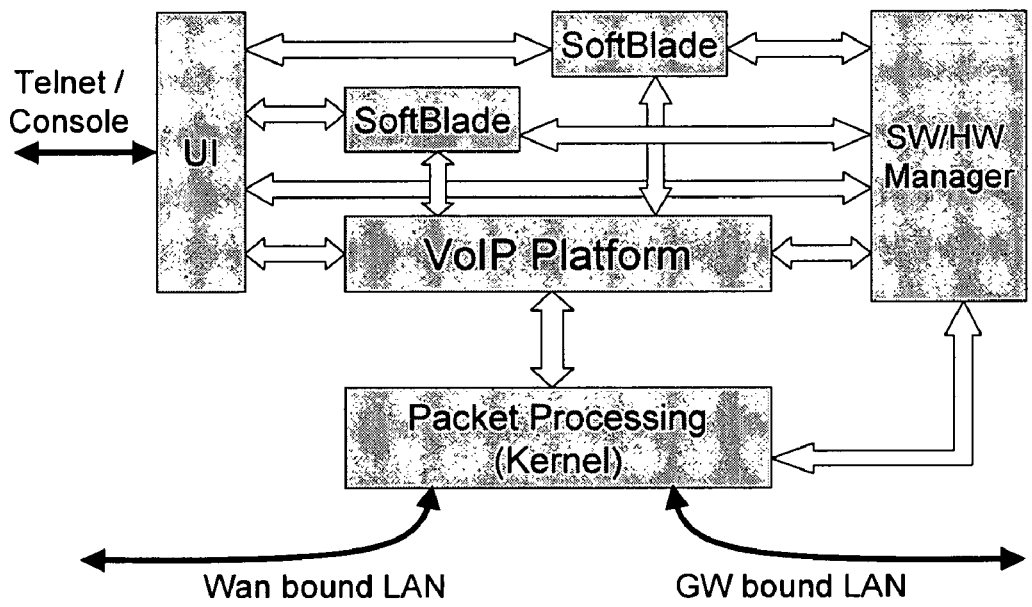
FIG. 13 is a block diagram illustrating an example computer system.

Reference is made to FIG. 13, which is a block diagram illustrating an example computer system.

The other part of the Kagoor solution is a set of applications (SoftBlades) running on top of the Kagoor platform. Those applications serve as Policy Decision Points and are the actual logic controlling the platform. The applications tell the box how and when to activate the various primitives, while the platform serves as a Voice OS abstracting for the application any low level protocol details.

Initially Kagoor intends to develop a small set of killer applications running on top of the platform. It is expected that later on third parties and customers will be able to expand this basic set by developing their own applications. It is expected that the protocols and APIs used for communication between the platform and applications will be standardized over time (e.g. a derivative of COPS or MEGACO).

Cost Reduction Applications Call Aggregation

Most VoIP gateways send a stream of small packets for each call. Each such packet carries approximately 80% of redundant data (packet headers) versus 20% of actual media encoding. This stream of very many small packets effectively reduces the available pipe size.

Through unique call aggregation and compression techniques the Kbox can increase the number of calls issued through a given pipe by a factor of 2-5. The call aggregation technique used by the Kbox is an adaptation of the well-known layer-2 Compressed RTP IETF standard to the use of large, IP networks.

The Kbox aggregates a number of calls to share the cost of headers between packets belonging to different calls. It also uses compression algorithms that make use of CallState, Kagoor's unique call tracking capabilities, to gain a further degree of bandwidth reduction.

The techniques used by the Kbox cause a substantial bandwidth reduction, while improving other aspects of the network behavior, such as reducing the routers' load and improving the queues' behavior.

Highlights

Figure 14:
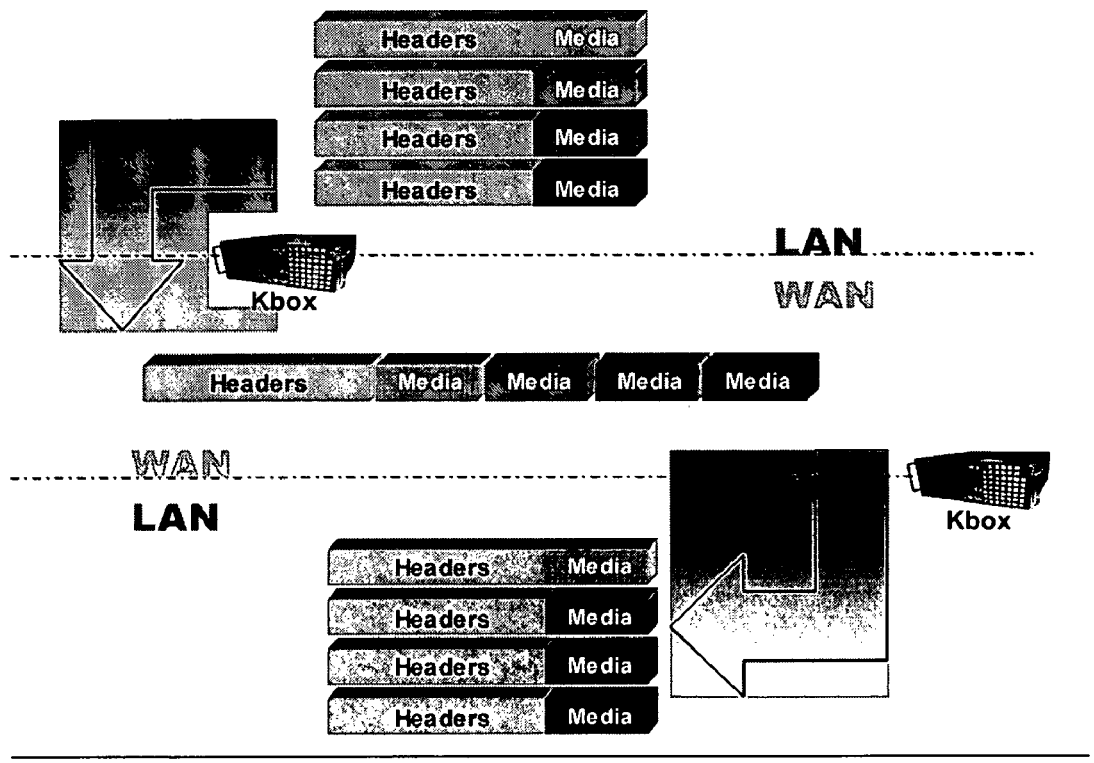
FIG. 14 is a block diagram illustrating call aggregation and compression techniques of a network device.

Utilize CallState technology to achieve up to 5-fold increase in effective bandwidth Ensures a prescribed limit on the induced latency Automatically reconstructs the overlaid Kbox network—no need for manual provisioning Better bandwidth utilization even in the case of very few concurrent calls Reference is made to FIG. 14, which illustrates call aggregation and compression techniques of the Kbox.

Application Level Call Routing

VoIP equipment, such as VoIP gateways and IP phones, blindly relies on the IP infrastructure for connectivity. While performing remarkably well for traditional, non-real-time traffic, conventional IP routing has many shortcomings when it comes to transport of real-time quality sensitive traffic, such as VoIP.

By deploying an overlaid network of Kboxes, the network operator can control the routing of the call in the IP cloud by designing (or engineering) alternative routes in the network. These routes can be used when congestion is identified along one of the default IP routes. When this happens, the Kboxes form a virtual path along which the traffic is redirected, thus circumventing the congested areas in the network.

Figure 15:
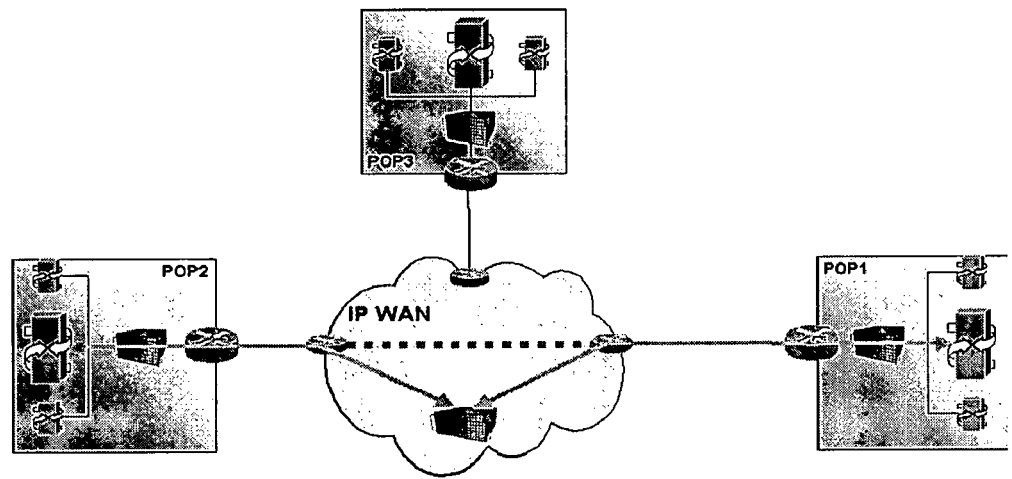
FIGS. 15-17 are block diagrams illustrating example networks.

Reference is made to FIG. 15, which is a block diagram illustrating an example network.

Highlights

Improves overall call quality by avoiding congested areas

Balances and averages out instantaneous peak loads in the network

Improves the predictability of voice service quality

Works in conjunction with Call Aggregation to ensure quality while decreasing overall bandwidth consumption Uses Quality Auto-Sense technology to automatically decide upon the diverting traffic to alternate routes Provides more effective path selection in MPLS networks Scalable Traffic Engineering The Kagoor box can serve as an intermediate box between disparate domains, some of with traffic engineering support (e.g. MPLS domains) and some without. It is rarely the case that regular traffic engineering methods can be used across the whole network. MPLS "islands" are usually separated by non-MPLS domains, and different neighbor carriers use different network architectures and technologies. Also, the traffic engineering methods usually include creating explicit routes between the network ingress and egress points. This would not scale to large networks as too many such explicit routes might be needed.

The Kagoor solution consists of building an overlaid network on top of the general network. Kagoor boxes can be deployed on a domain edge and in peering points. Within the domain either regular traffic engineering methods can be used such as explicit route establishment using protocol such as RSVP-TE and CR-LDP, or new routes can be created between the Kagoor boxes within the domain. A carrier may be able to guarantee an SLA (Service Level Agreement) between a pair of Kagoor boxes residing on two edges of its network. The overall result is a rather small number of routes between the (not too many) edge Kagoor boxes. Traffic engineering can further be deployed on a network-wide scale by establishing specific routes between Kagoor boxes of different domains. Each of the traffic engineered path between a pair of Kagoor devices becomes a "link" in the global network traffic engineering process. Such a link will have its own set of provisioned (and measured) attributes such as bandwidth, delay, etc. These can often be guaranteed by an SLA with the service provider.

An appropriate routing protocol can run between the overlaid network Kagoor devices to establish such routes. The devices can further measure and collect information on the call quality of each path segment and feed this information as constraints into the constraint base routing protocols. Measurement can either be passive, by listening to ongoing calls, or active, by generating specific calls with specific parameters and measuring their performance.

Figure 16:
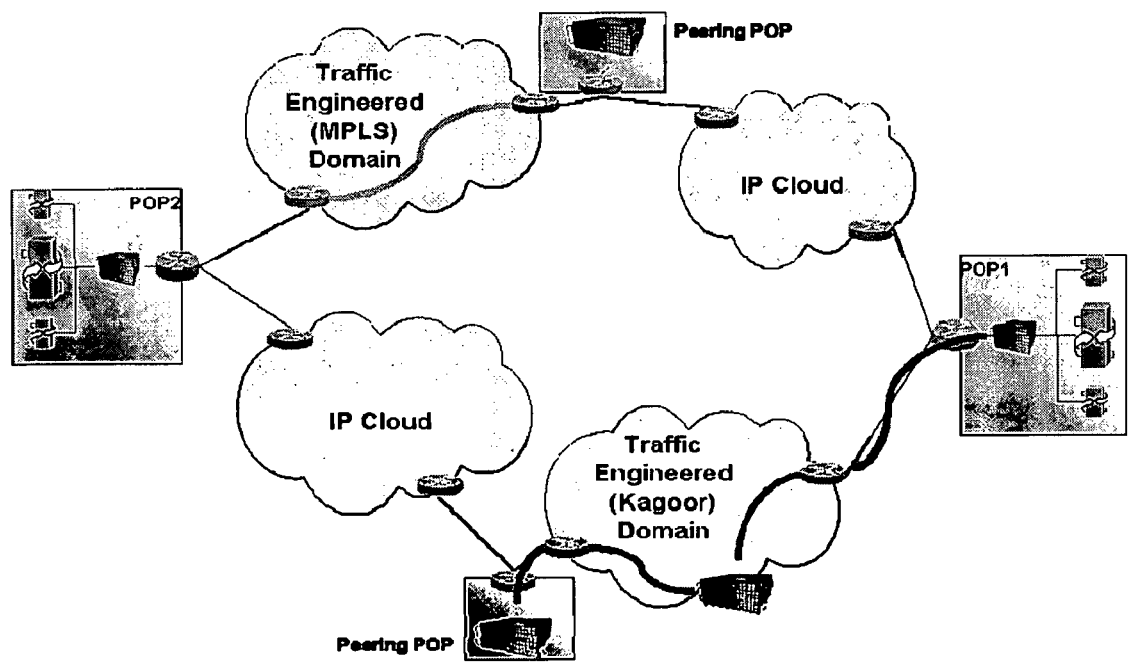

An example network is shown in FIG. 16.

Routes within a domain can be traffic engineered using MPLS or set using the overlaid Kagoor network. Routes between separate domains can be set between the Kagoor boxes of those domains.

RSVP Aggregation

The ReSerVation Protocol (RSVP) can be used to reserve certain network resources (bandwidth, buffer sizes) in routers along a network path for a specific flow of traffic. The main problem with RSVP is its inability to scale due to the fact that each router along the way is required to maintain state for each microflow going through it. That can mean millions of states in the backbone routers. A recent development in the IETF allows for aggregation of multiple smaller reservations into one bigger pipe in a hierarchical way. The Kagoor box can be an ideal location to serve as an aggregation point, especially when combining it with the call re-routing application. Fat reservations can be established across the network between pairs of Kagoor devices according to policies relying on various parameters such as the number of current calls, statistics on call patterns, etc. Those aggregated reservations can be dynamically modified according to network conditions, time of day, expected traffic patterns, etc. The Kagoor box can then also serve as an admission control point in order to decide which calls get to use which routes and reservations.

Load Balancing Among Voice Gateways

VoIP POPs often have a multitude of VoIP gateways with new gateways gradually being added as more capacity is required. Managing large farms of VoIP gateways becomes complex and does not allow the ISP to fully exploit the available resources.

By deploying a Kagoor box in front of a gateway farm the ISP can configure the full farm to be represented to the rest of the network by a single IP address, that of the Kbox, and have the Kbox balance the load between the VoIP gateways. The Kbox will be able to support various load-balancing algorithms, many of which are already widely used to balance between WEB servers in WEB server farms.

The Kbox can decide, in real time and based on dynamic measurements and provisioned information, how to route an incoming call and make sure it is handled by the most appropriate gateway in the farm according to various policies set by the network administrator.

Revenue Protection Applications Billing & Interconnect Verification

Figure 17:
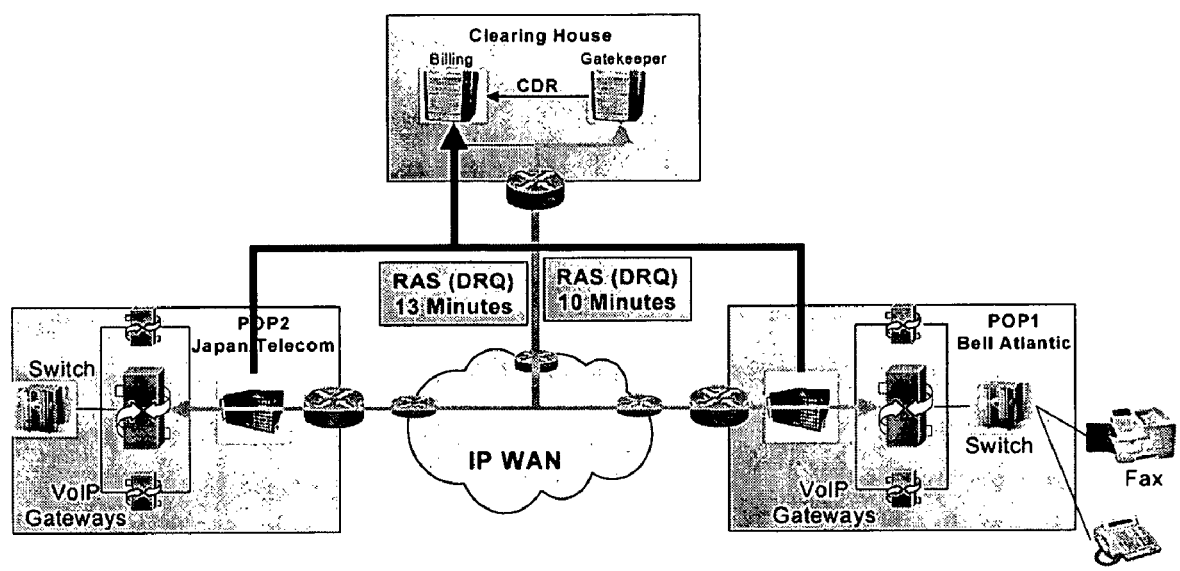

Reference is made to FIG. 17, which is a block diagram illustrating an example network.

The Kagoor box parses the VoIP protocols both on the media level and the signaling level, and thus can get very accurate details about each call. This includes the call length, number of packets transmitted, service granted to these packets (e.g. in terms of a DiffServ CodePoint or RSVP reservation), quality (e.g. jitter, dropped packets), etc. The kagoor box is then able to issue a detailed, accurate and vendor independent Call Details Record (CDR or IPDR) containing this information. Note that unlike the Gatekeeper the Kagoor box "sees" not only the signaling but also the media and can associate the media flows with the signaling flows to make sure the network operator gets a full picture of network usage. The Kagoor box is the only source of information that relies on the actual network activity to measure the call details. Service providers, especially ones working in the clearinghouse model, can use the Kagoor box to verify the accuracy of CDRs generated by affiliates' equipment, and to resolve disputes for CDRs which come up differently by the two parties.

Note also that the Kagoor box is an active element which means that other primitives can be activated to actually enforce certain policies in case of billing problems (e.g. it can drop a call which is too long).

Access Control & Fraud Detection

The openness of the IP domain and standards and the relative sophistication of modern Customer Premises Equipment (CPE) make it a trivial matter for malicious users to bypass the billing mechanisms of current VoIP service providers. One of the main problems is that the current architecture relies on the endpoint to issue certain signaling requests whenever a call starts and ends. This can usually be almost guaranteed in environments where all the equipment resides in the service provider network and is controlled by it (e.g. when using VoIP gateways within the POP). However, the assumption is no longer valid as soon as the endpoint moves to the CPE (a residential gateway, IP phone or PC phone). The Kagoor box is an active element in the network that is able to track down fraudulent calls, and, based on the service provider's policy, drop them in real-time. This can be done by the box listening to both the signaling and the media and checking for any inconsistencies between them. For example, a case where a user signals the end of a call but keeps the media stream alive will be easily detected by the box. The call can then either be dropped or charged according to the actual use. The administrator can even decide to change the media stream itself—e.g. to sound a certain warning.

Protection Against Denial of Service Attacks

As recently demonstrated by massive attacks on major e-Commerce sites such as Amazon and Yahoo, the more open and useful a system is the more exposed it is to such attacks. Commercial VoIP systems are based on existing and emerging standard protocols (H.323, SIP, etc.) and are generating ever increasing commercial minutes. Due to the complexity of the protocols it is very easy to attack VoIP devices such as gateways in a way regular firewalls cannot prevent. For example, a gateway can get bombarded with RTP-like packets which have dynamic port numbers and are therefore very difficult to detect by a regular firewall. Such fake RTP packets can in many cases either interfere with existing calls, deny access to free ports, and even cause the gateway to halt operation. The Kagoor box provides more extensive protection against such attacks by explicitly tracking all the call states along with their port numbers and expected usage patterns. Most fake RTP-like floods can be immediately detected and discarded before they reach the gateways.

RTP Reconstruction

RTP packets lost on their way between the sender endpoint to the receiver endpoint can severely hurt the call quality. The human ear is very sensitive to such loss and even a loss of fraction of the packets can lead to an unacceptable quality, depending on the actual codec in use. Interestingly, a great part of a lost RTP packet can be recovered and reconstructed based on various extrapolation techniques. Such techniques can either work on the compressed voice media packets, or on the uncompressed analogue voice. Most endpoints either do not have the CPU power, or the intelligence to be able to recover such lost packets. The Kagoor box residing in front of the endpoint can serve as an RTP reconstructor for such endpoints: it can sense for lost packets and use various techniques and algorithms for reconstructing a packet as close as similar to the original missing one. The artificially generated packet will be sent to the endpoint. The voice quality might not be as perfect as with the original packet but can be still much better than the endpoint codecs dealing with a lost packet.

Call Privacy

The Kagoor box, residing in the voice traffic path, can encrypt all calls going through it and decrypt them on the other end of the connection. The service provider can deploy various policies regarding which calls to encrypt and the encryption method to use and can charge for this service accordingly. It can further allow the end customer new privacy services such as blocked caller ID—the Kagoor box can block such information as soon as the voice signaling leave the Kagoor box and enters the service provider network.

Differentiated Services

The Kagoor box serves as a Voice Policy Enforcement Point and can be used for admission control and for policing and ensuring the level of service provided to each call. The box can actively set the priority of each call according to industry standards such as DiffServ and MPLS. It can also accept or deny resource reservation requests based on dynamic or static policies and even serve as an RSVP proxy. The box can further police and shape the traffic going through it to conform with predefined bandwidth constraints and minimum guarantees.

Lawful Interception

Some regulatory environments require service providers to provide government agencies the ability to tap into voice calls. There are established solutions for such lawful interception for PSTN carriers but none for ITSPs. The Kagoor box can be used to dynamically duplicate calls going through it and send the required voice packets (both signaling and media) to a tracking system which can be used to actually tap into the calls. The tapping system should be sophisticated enough to be able to reconstruct the call from the saved information (e.g. review the signaling and media and associate between them, synchronize between the two or more parties, etc.).

Service Selection

The Kagoor box resides on the POP edge and can be connected to multiple backbone service providers. It can allow voice traffic to be routed onto a specific network according to multiple parameters including user preference, network quality, chosen service, etc. The user gains the ability to choose between a multitude of services and service providers. For example, the access service provider can route the calls through a private high quality network, or through the open Internet based on how much the user is willing to pay. Also—the access service provider can work with multiple carriers offering different service levels and pass these services on to the end user.

Benefits of the Kagoor Approach

The Kagoor approach enables the implementation of multiple applications on top of a unified hardware and software platform specifically tailored for VoIP policy enforcement. Some of the applications may be implemented in other devices such as voice endpoints (gateways or IP phones) or routers. However, many of the applications either only work on a separate device or have inherent advantages when applied in a separate entity. Here we analyze some of the benefits of the Kagoor solution.

Vs. Endpoints

Aggregation point for multiple endpoints. Applications that work on multiple voice sessions simultaneously (e.g. call aggregation) often get more effective as the number of concurrent calls gets larger. In the case of call aggregation the larger the number of calls sharing a common network sub-route, the better the bandwidth utilization that can be achieved. By aggregating calls originating from multiple endpoints (gateways and IP phones) the Kagoor solution improves the ability to aggregate more calls. This is obvious in case of IP phones in which case aggregation simply is not applicable on a single phone.

Off-POP CPE endpoints. Many of the Kagoor applications (e.g. call re-routing) can work equally well for endpoints such as IP phones, PC-based phones, IP-PBXs and residential gateways. The service provider's gateways are not in the path of any of these endpoints and therefore cannot play the role the Kagoor device can (the GW is focused on PSTN interfacing, and not in the path of off-POP IP endpoints). The need for a network based policy enforcement point surfaces from the fact that policy enforcement needs to be centralized, and located in a trusted environment—unlike CPE endpoints.

The market trend is to offload intelligence from the gateways, leaving them to focus on DSP processing. An example is the MEGACO protocol which separate the media gateway from the media gateway controller (softswitch).

Gateway farm applications. Such applications can inherently work only from a separate box. The best example is that of gateway load balancing.

Network location flexibility. Some of the applications, like call aggregation, can be implemented in multiple locations along the network path and sometime even in a hierarchical manner. Having them implemented on the gateway would prevent this kind of flexibility.

Updates and upgrades. The applications deployable over a Kagoor box are generally innovative and new in nature. It is expected that many of these applications will evolve dramatically over time and so would some of the standards. Implementing the functions on the endpoints would require constant update of the endpoints, possibly both hardware and software which does not scale well. It would make much more sense to have these functions centralized, and thus easily upgradeable, at least until they become somewhat commoditized (e.g. relevant standards are put in place).

Feature availability. Such new applications and features usually take long period of time to find their way into actual products. By using a centralized implementation such as a Kagoor box a customer can start enjoying the benefits of the applications way before the rest of the equipment catches up with it (if at all).

Vs. Gatekeepers and Softswitches

Active packet manipulation. Gatekeepers and Softswitches may have the logic to implement some of the applications but in many cases require an active manipulation of the packets. However, since they do not reside within the traffic path they will have to rely on separate entities (such as the Kagoor device) to perform the actual function.

Network layer capabilities. Gatekeepers and softswitches are focused on service level functionality and the application layers, and can not affect the lower levels of the protocol hierarchy.

Network location. The gatekeepers and softswitches are put in more centralized network locations, rather than on the network edge or interconnect points. This limits their ability to implement some of the applications which are only relevant in such points.

Vs. Routers and Switches

Vertical focus. Most routers and switches are focused on packet forwarding as their core functionality. Many of the Kagoor-based applications are very vertical to VoIP and require intimate understanding of the underlying protocols which is inappropriate for routers and switches.

CPU power. Routers and switches often have limited CPU power which is just enough to allow them effective forwarding of packets. These devices can not perform packet processing all the way through layer 7, especially for complicated protocols like VoIP signaling.

Non-programmability. Most routers and switches were not designed for and do not offer any programmable interfaces to external applications. The Kagoor box is specifically designed to expose such interfaces and allow external logic to control the platform primitives.

Reliability. Customers are usually reluctant to compromise their network reliability by turning on new fancy features on their routers and switches unless they were designed specifically to perform those tasks.

General Benefits

Underlying protocol abstraction. The Kagoor Voice platform can hide from the applications lots of the details which are protocol specific thus creating an abstraction layer. This lets the applications focus on the logic they intend to implement rather than on non-important details and would scale to new protocols as they evolve over time.

Programmability. The Kagoor solution is designed as a voice PEP platform with a set of voice PDP applications controlling its primitives. This allows for very efficient primitive implementation and lets external applications containing the actual logic to be developed and deployed rapidly on top of it. Such applications can be developed by Kagoor as well as by third parties and customers.

Voice focus. Focusing on voice traffic rather than on general data traffic allows the Kagoor platform to tailor vertical primitives specifically for voice. For example adaptive dynamic traffic engineering applications can take into account accurate voice quality measurements as taken by the Kagoor device. As an another example voice firewalling can be implemented with minimum delay and without compromising call quality.

Call Aggregation

Packetized voice is transmitted over IP networks using the RTP (Real Time Protocol) protocol. This means that each media packet has to carry an IP header, UDP header and RTP header. The 40-byte overhead incurred by these headers is huge when used with some of the more common codecs, which packetize the voice traffic into media chunks of no more than 10-20 bytes. This inefficiency means that the effective utilization of network links carrying voice traffic might be less than 20%.

Major improvement of the effective bandwidth utilization can be achieved by aggregating (multiplexing) more than one media payloads of few different calls on top of a single header overhead.

Packetized Voice

The TDM network transports voice in uncompressed (G.711) 125 msec samples on a circuit switched network, effectively providing end-to-end latency that is closed to wire-speed.

On IP networks voice is transferred by sending the media payloads encapsulated in RTP (Real Time Protocol) messages. Transporting RTP packets with small samples of a single PCM voice (uncompressed G.711) channel can be very inefficient and expensive due to overhead imposed by the RTP/UDP/IP header in each voice packet (the header length is 40 bytes). In order to improve the efficiency VoIP solutions are incorporating larger samples of a PCM channel, applying complex compression algorithms, or codecs, all at the cost of increased latency. The relevant codecs include G.723.1, G.729, G.729a and AudioCodes' Netcoder.

The following table lists some of the codecs along with their frame size, packets generated per second (pps), required bandwidth, and payload size.

| Codec | Frame size (ms) | pps | Bit rate (Kbps) | Payload size (bytes) |
|---|---|---|---|---|
| Netcoder | 20 | 50 | 4.8-9.6 | 12-24 |
| G.723.1 | 30 | 33 | 5.3-6.3 | 20-24 |
| G.729 | 10 | 100 | 8 | 10 |
| G.729a | | | | |

An RTP packet is structured as follows:

| IP Header 20 bytes | UDP Header 8 bytes | RTP Header 12 bytes | Media Payload 10-20 bytes |
|---|---|---|---|

A network link carrying lots of voice traffic ends up with effective bandwidth utilization that is roughly 20-30% of the actual capacity. Such is the case with a Voice Point Of Presence (POP) hosting a farm of Media Gateways, which generates almost exclusively voice traffic.

Header Compression

CRTP

One way to resolve the overhead problem is to compress the header(s). A key observation is that some parts of the header(s) are either constant throughout a session (or rather long portions of it) or are changed in some deterministic way. The idea is to send the full header only once (or once in a while), associate the constant fields with some unique Context Identifier (CID), and in subsequent packets only send the CID along with the changing fields and any other required info to enable reconstruction of the full header at the receiving side. Note that it is required that the CIDs will be unique on the receiver side so it can correctly fetch the information associated with each session.

IP Header Compression

An IP header is a 20-byte sequence with the following structure:

| 0 | 1 | 2 | 3 | 4 | 5 | 6 | 7 |
|---|---|---|---|---|---|---|---|
| Version | IHL | TOS | | Total Length | | | |
| Identification | | | | Flags | | Fragment Offset | |
| TTL | | Protocol | | Header Checksum | | | |
| Source Address | | | | | | | |
| Destination Address | | | | | | | |
| Options | | | | | | | Padding |

For IPv4 normally within a session only the Total Length, Identification, and Header Checksum fields are subject to change between packets. The Total Length field is redundant with the length provided by the link layer. The Header Checksum may be elided if there is good error detection in the link layer (e.g. when running over PPP, due to PPP's CRC). The Identification field needs to be present only when there is IP fragmentation.

However, in order to maintain loss-less compression it is suggested to transmit changes in the ID field. The ID field usually increments by one or a small number for each packet (some systems increment the ID with the bytes swapped, which results in slightly less compression).

For IPv6 there is no packet ID nor Header Checksum and only the Payload Length field changes.

UDP Header Compression

A UDP header is an 8-byte sequence with the following structure:

| 0 | 1 | 2 | 3 | 4 | 5 | 6 | 7 |
|---|---|---|---|---|---|---|---|
| Source Port | | Destination Port | | Length | | Checksum | |

In the UDP header, the Length field is redundant with the IP Total Length field and the length indicated by the link layer. The UDP Checksum field will be a constant zero if the source elects not to generate UDP checksums. Otherwise, the checksum must be communicated intact in order to preserve the loss-less compression.

RTP Header Compression

An RTP header is a 12 bytes sequence with the following structure:

| 0 | | | | | | | | | 1 | | | | | | | | | 2 | | | | | | | | | 3 | |
|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| V | P | X | | CC | | | | M | | PT | | | | | | Sequence Number | | | | | | | | | | | | | | | |
| Timestamp | | | | | | | | | | | | | | | | | | | | | | | | | | | | | | | |
| Synchronization Source (SSRC) Identifier | | | | | | | | | | | | | | | | | | | | | | | | | | | | | | | |
| Contributing Source (CSRC) Identifiers . . . | | | | | | | | | | | | | | | | | | | | | | | | | | | | | | | |

The RTP header can be compressed in various ways with general tradeoff between the complexity (and sensitivity to packet loss) and the compression quality.

In the RTP header, the SSRC Identifier is constant in a given context since that is part of what identifies the particular context. For most packets, only the Sequence Number and the Timestamp will change from packet to packet. If packets are not lost or mis-ordered upstream from the compressor, the Sequence Number will increment by one for each packet. For audio packets of constant duration, the Timestamp will increment by the number of sample periods conveyed in each packet. For video, the Timestamp will change on the first packet of each frame, but then stay constant for any additional packets in the frame. If each video frame occupies only one packet, but the video frames are generated at a constant rate, then again the change in the Timestamp from frame to frame is constant. Note that in each of these cases the second-order difference of the Sequence Number and Timestamp fields is zero, so the next packet header can be constructed from the previous packet header by adding the first-order differences for these fields that are stored in the session context along with the previous uncompressed header. When the second-order difference is not zero, the magnitude of the change is usually much smaller than the full number of bits in the field, so the size can be reduced by encoding the new first-order difference and transmitting it rather than the absolute value.

The M bit will be set on the first packet of an audio talkspurt and the last packet of a video frame. If it were treated as a constant field such that each change required sending the full RTP header, this would reduce the compression significantly. Therefore, one bit in the compressed header should carry the M bit explicitly.

If the packets are flowing through an RTP mixer, most commonly for audio, then the CSRC list and CC count will also change. However, the CSRC list will typically remain constant during a talkspurt or longer, so it need be sent only when it changes.

CRTP

CRTP is a link-by-link compression mechanism for RTP packets running directly over PPP. It was designed explicitly for slow-speed links and is defined in [CRTP]. Below we outline some parts of the protocol.

The compression protocol must maintain a collection of shared information in a consistent state between the compressor and de-compressor. There is a separate session context for each IP/UDP/RTP packet stream, as defined by a particular combination of the IP source and destination addresses, UDP source and destination ports, and the RTP SSRC field. The number of session contexts to be maintained may be negotiated between the compressor and de-compressor.

Each context is identified by an 8- or 16-bit identifier (CID), depending upon the number of contexts negotiated, so the maximum number is 65536. Both uncompressed and compressed packets must carry the CID and a 4-bit sequence number used to detect packet loss between the compressor and de-compressor. Each context has its own separate sequence number space so that a single packet loss need only invalidate a single context.

The shared information in each context consists of the following items:
  The full IP, UDP and RTP headers, possibly including a CSRC list, for the last packet sent by the compressor or reconstructed by the de-compressor.
  The first-order difference for the IPv4 ID field, initialized to 1 whenever an uncompressed IP header for this context is received and updated each time a delta IPv4 ID field is received in a compressed packet.
  The first-order difference for the RTP timestamp field, initialized to 0 whenever an uncompressed packet for this context is received and updated each time a delta RTP timestamp field is received in a compressed packet.
  The last value of the 4-bit sequence number, which is used to detect packet loss between the compressor and de-compressor.
  The current generation number for non-differential coding of UDP packets with IPv6 (see [3]). For IPv4, the generation number may be set to zero if the COMPRESSED_NON_TCP packet type, defined below, is never used.
  A context-specific delta encoding table (see section 3.3.4 in [CRTP]) may optionally be negotiated for each context.

In order to communicate packets in the various uncompressed and compressed forms, this protocol depends upon the link layer being able to provide an indication of four new packet formats in addition to the normal IPv4 and IPv6 packet formats:
  FULL_HEADER—communicates the uncompressed IP header plus any following headers and data to establish the uncompressed header state in the de-compressor for a particular context. The FULL-HEADER packet also carries the 8- or 16-bit session context identifier and the 4-bit sequence number to establish synchronization between the compressor and de-compressor. The format is shown in section 3.3.1 of [CRTP].
  COMPRESSED_UDP —communicates the IP and UDP headers compressed to 6 or fewer bytes (often 2 if UDP checksums are disabled), followed by any subsequent headers (possibly RTP) in uncompressed form, plus data. This packet type is used when there are differences in the usually constant fields of the (potential) RTP header. The RTP header includes a potentially changed value of the SSRC field, so this packet may redefine the session context. The format is shown in section 3.3.3 of [CRTP].
  COMPRESSED_RTP—indicates that the RTP header is compressed along with the IP and UDP headers. The size of this header may still be just two bytes, or more if differences must be communicated. This packet type is used when the second-order difference (at least in the usually constant fields) is zero. It includes delta encodings for those fields that have changed by other than the expected amount to establish the first-order differences after an uncompressed RTP header is sent and whenever they change. The format is shown in section 3.3.2 of [CRTP].
  CONTEXT_STATE—indicates a special packet sent from the de-compressor to the compressor to communicate a list of context IDs for which synchronization has or may have been lost. This packet is only sent across the point-to-point link so it requires no IP header.

The format is shown in section 3.3.5 of [CRTP].

When this compression scheme is used with IPv6 as part of the general header compression framework specified in [IPv6HC], another packet type MAY be used:
  COMPRESSED_NON_TCP—communicates the compressed IP and UDP headers as defined in [IPv6HC] without differential encoding. If it were used for IPv4, it would require one or two bytes more than the COMPRESSED_UDP form listed above in order to carry the IPv4 ID field. For IPv6, there is no ID field and this non-differential compression is more resilient to packet loss.

Assignments of numeric codes for these packet formats in the Point-to-Point Protocol [PPP] are to be made by the Internet Assigned Numbers Authority.

Note that CRTP usually reduces the IP/UDP/RTP headers to a mere 2 bytes down from 40.

End-to-End Bandwidth Optimization

CRTP is a link-layer protocol. As such the header has to be compressed and then decompressed at each and every intermediate router to achieve an end to end effect. Since the compression (and decompression) operation is CPU intensive and has to be done for each and every RTP packet this is not a scalable solution. It also requires each and every router along the path to support the protocol.

One option to support an end-to-end operation is to compress just the UDP and RTP headers and leave the IP header in place (possibly after some modifications). However the savings in this case are not as substantial as in the case of CRTP.

RTP Aggregation

A better approach would be to aggregate multiple RTP packets, from different calls, onto one header. This can be done if there are multiple concurrent calls whose RTP packets are traversing a common sub-route. In this case an aggregator (mixer) can use an IP/UDP/RTP header compression mechanism and then multiplex few such compressed fragments in one packet and send this single packet to the de-aggregator. Aggregation can also be referred to as call multiplexing and call trunking.

The main drawback of this aggregation mechanism is that in order to aggregate enough packets we might need to delay a bit the first packet to allow for more packets of the same trunk to arrive at the aggregator. It seems that the best approach would be to make the maximum allowed delay a configuration parameter: when the first packet of a trunk arrives a timer is activated. Subsequent packets are aggregated and then the new aggregated packet is sent as soon as there are enough fragments, or the timer has elapsed (the earlier between the two). Below we provide a deeper analysis of the performance of such an algorithm.

The compression method used by CRTP is very efficient but relies heavily on the fact that virtually no loss can occur at the link layer. This assumption is obviously no longer true when compressing RTP packets end-to-end as those packets can easily be dropped or delayed. A different mechanism that is less sensitive to loss is therefore required.

Below we outline one example of a protocol based on the concept presented above with the required characteristics.

The aggregated packet may take the following format:

```
 0                   1                   2                   3
 0 1 2 3 4 5 6 7 8 9 0 1 2 3 4 5 6 7 8 9 0 1 2 3 4 5 6 7 8 9 0 1
+-------+-+---------------+-------------------------------+
|Version|0| Sequence Number|          Trunk ID           |
+-------+-+---------------+-----------------------------+
|                  Compressed RTP Segment                 |
|                          ...                            |
+---------------------------------------------------------+
|                  Compressed RTP Segment                 |
|                          ...                            |
+---------------------------------------------------------+
```

Version: a 3-bit field indicating the version of the aggregation protocol.

Sequence Number: a 12-bit field that is incremented for each aggregated packet of this trunk. The sequence number is used to detect packet loss and act accordingly. The initial value of the sequence can be arbitrary (as in RTP).

Trunk ID: a 16-bit field which serves as a unique ID for the trunk. Each trunk has its own space of session context IDs (CIDs) as explained below. The Trunk ID is selected by the de-aggregator to make sure it is unique per the de-aggregator (note that the de-aggregator can recognize a trunk not only by its ID but also by the aggregator IP address).

Each aggregated RTP fragment may have the following format:

```
 0                   1                   2                   3
 0 1 2 3 4 5 6 7 8 9 0 1 2 3 4 5 6 7 8 9 0 1 2 3 4 5 6 7 8 9 0 1
+-----------+-+-------------------------------------------+
|    CID    |C|
+-----------+-+
|                       RTP Packet                        |
|         (compressed or uncompressed depending on the C bit)
|                                              +----------+
|                                              | Padding  |
+----------------------------------------------+----------+
```

CID: a 6-bit field indicating the session Context ID for this RTP fragment. This ID is unique within the trunk and can therefore be selected by the aggregator. It is used to associate the packet with the information that was compressed and does not appear in the fragment.

C: a 1-bit flag indicating whether the RTP packet is compressed or uncompressed (see below).

An uncompressed RTP segment may take the following format:

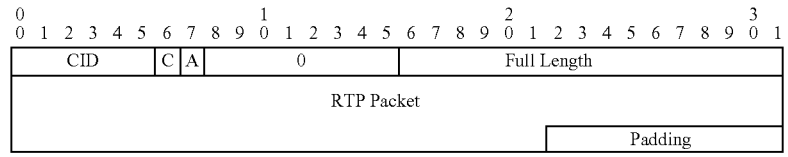

Full Length: a 16-bit field containing the full length of the RTP packet contained in this segment.

RTP Packet: the full uncompressed RTP packet, copied verbatim from the original UDP packet.

Padding: used to align the end of the segment to the next 4-byte boundary.

A compressed RTP segment may take the following format:

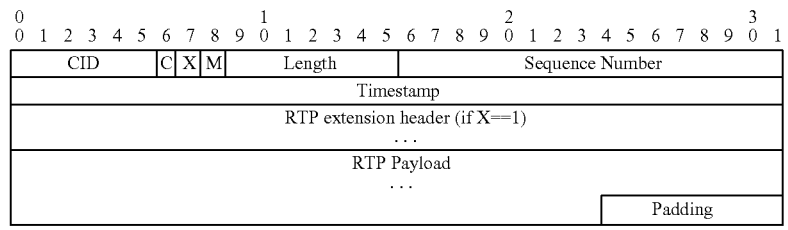

X: a one-bit flag carrying the RTP header's extension bit, which indicates whether an RTP extension header appears in the segment.

M: a one-bit field carrying the RTP header's marker bit.

Length: a 7-bit field indicating the RTP payload's length. Note that this length does not include the segment's header nor the RTP extension header.

Sequence Number: a 16-bit field carrying the RTP header's sequence number.

Timestamp: a 32-bit field carrying the RTP header's timestamp.

RTP payload: the payload of the original RTP packet.

Padding: used to align the end of the segment to the next 4-byte boundary.

Note that the CID can be kept rather small since it only has to be unique within the trunk. The flow context is identified by the trunk ID and the CID (and possibly also by the aggregator IP address).

Also note that this protocol is not sensitive at all to packet loss since all the information required to reconstruct the full RTP packet is self contained in each such aggregated packet along with the session information which is already stored at the de-aggregation point.

To calculate the bandwidth saving of this compression example lets look at n concurrent RTP flows using the G.723.1 codec (suppose the payload length is 10 bytes). The overhead of these n RTP packets is 40*n. Lets denote by hl the header length of the aggregated packet. Note that the aggregated packet can be sent directly over IP (in which case hl=20+4), directly over UDP (hl=28+4) or over header-compressed L2TP (hl=21+4). Each fragment is reduced from 40+10 to 8+10 bytes. Thus the overall packet length will be hl+18*n. The following table demonstrates the bandwidth savings using this algorithm:

The compression scheme can be further improved if each compressed segment will contain only partial information about the sequence number and timestamp fields. For example,

| # Calls | 1 | 2 | 4 | 10 | 50 | 100 |
|---|---|---|---|---|---|---|
| Original length (Bytes) | 50 | 100 | 200 | 500 | 2500 | 5000 |
| Compressed length (Bytes) | 42 | 60 | 96 | 204 | 924 | 1824 |
| Savings | 16% | 40% | 52% | 59% | 63% | 64% | we can send only the 6 least significant bits of the sequence number and 10 least significant bits of the timestamp. The de-compressor can correctly reconstruct the original packets as long as not too many consecutive fragments (along with their packets) are lost. In this case the n RTP packets will be reduced from a total of 50*n to hl+4*n.

The bandwidth savings are shown below:

| # Calls | 1 | 2 | 4 | 10 | 50 | 100 |
|---|---|---|---|---|---|---|
| Original length (Bytes) | 50 | 100 | 200 | 500 | 2500 | 5000 |
| Compressed length (Bytes) | 38 | 52 | 80 | 164 | 724 | 1424 |
| Savings | 24% | 48% | 60% | 67% | 71% | 72% |

Concurrent Calls Analysis

Note that the compression algorithm suggested above uses CIDs of 6 bits. This imposes a limitation of 64 on the maximum number of calls we can aggregate in a trunk. The problem with such a limitation is that it might require longer delays in order to be able to aggregate enough packets to achieve the required bandwidth savings. In this section we analyze this limitation.

Assume each RTP stream is using a codec with frame size f milliseconds (f=30 in case of G.723.1). Further suppose we allow for maximum delay of d milliseconds before forwarding an RTP packet.

Lets denote by X the number of RTP packets which arrive after the first RTP packet of the trunk during the d milliseconds period. X is a binomial random variable with the following distribution function: $X \sim Bin(d/f, 63)$. The number of RTP segments in the RTP packet will be 1+X. The following table shows the probability of having at least a given number of packets to aggregate as a function of the allowed delay.

|  | delay | 2 | 4 | 6 | 8 | 10 | 20 |
|---|---|---|---|---|---|---|---|
| Minimum number of packets to aggregate | 2 | 0.988 | 1.000 | 1.000 | 1.000 | 1.000 | 1.000 |
| | 3 | 0.933 | 0.999 | 1.000 | 1.000 | 1.000 | 1.000 |
| | 4 | 0.808 | 0.994 | 1.000 | 1.000 | 1.000 | 1.000 |
| | 5 | 0.625 | 0.978 | 1.000 | 1.000 | 1.000 | 1.000 |
| | 8 | 0.133 | 0.766 | 0.982 | 0.999 | 1.000 | 1.000 |
| | 10 | 0.026 | 0.487 | 0.916 | 0.995 | 1.000 | 1.000 |
| | 15 | 0.000 | 0.040 | 0.402 | 0.844 | 0.984 | 1.000 |
| | 20 | 0.000 | 0.000 | 0.042 | 0.336 | 0.772 | 1.000 |

For example, this means that if we allow a delay of 10 milliseconds it is virtually guaranteed that we will have at least 10 packets to aggregate.

Standalone Aggregation

Obviously for call aggregation to be effective it must be able to aggregate enough calls traversing the same bandwidth-sensitive network sub-route. Aggregation can be done either on the device actually generating the media streams or on a separate device residing somewhere in front of the RTP source. There are few important benefits in separating the aggregation functionality and using a standalone entity:

- An endpoint can only aggregate the media streams it generates. It does not have the ability to aggregate calls from other endpoints even if those endpoints reside just next to it (e.g. connected to the same switch) and generate streams which goes exactly to the same destination, i.e. sharing the exact route.
- Many types of endpoints are low scale and do not generate more than few calls. A residential gateway in a home or SOHO would typically not generate more than 1-2 concurrent calls, and the chances of these going to the same destination are obviously much lower. An IP phone or PC phone is even a more extreme example of an endpoint which can not generate more than one call, in which case aggregation won't work at all.
- Separating the aggregation point allows aggregation to be done virtually anywhere within the network path. This allows a very flexible aggregation deployment to make sure bandwidth is optimized over the more sensitive network segments.
- The separate aggregation points can be deployed in a hierarchical way. The closer an aggregator is to the core of the network the more calls it can aggregate. Policies can be defined regarding where flows gets aggregated and de-aggregated along the hierarchy.
- As is always the case with new functions it might take a long time for this to be available in many different endpoints. Separating the function into a standalone device which inter-operates with various endpoints and endpoint types allows the customer to keep using the same endpoints, and allows the endpoint vendors to focus on their core functionality.
- As is always the case with new functions it is clear that new improvements and vertical developments on top of the basic call aggregation function will be suggested over time. Again, separating this function into a standalone aggregation/de-aggregation device would allow improving and modifying these devices over time without the need to bother with the endpoints themselves.
- The call aggregation functionality has a lot to do with other vertical functions such as traffic engineering. For example, the presence of an aggregation/de-aggregation point in a certain path can serve as a constraint or change the parameters of constraint-based routing protocols which take into account available bandwidth and other resources. An aggregation point is a natural candidate to participate in such protocols, generate tunnels (e.g. MPLS' LSPs) between the aggregator and de-aggregator, and route the traffic accordingly. Embedding the aggregation functionality into the endpoint might mean that all such related functions (e.g. traffic engineering) must also be embedded into the endpoint to achieve the same optimizations.

Hardware Overview

Figure 1:
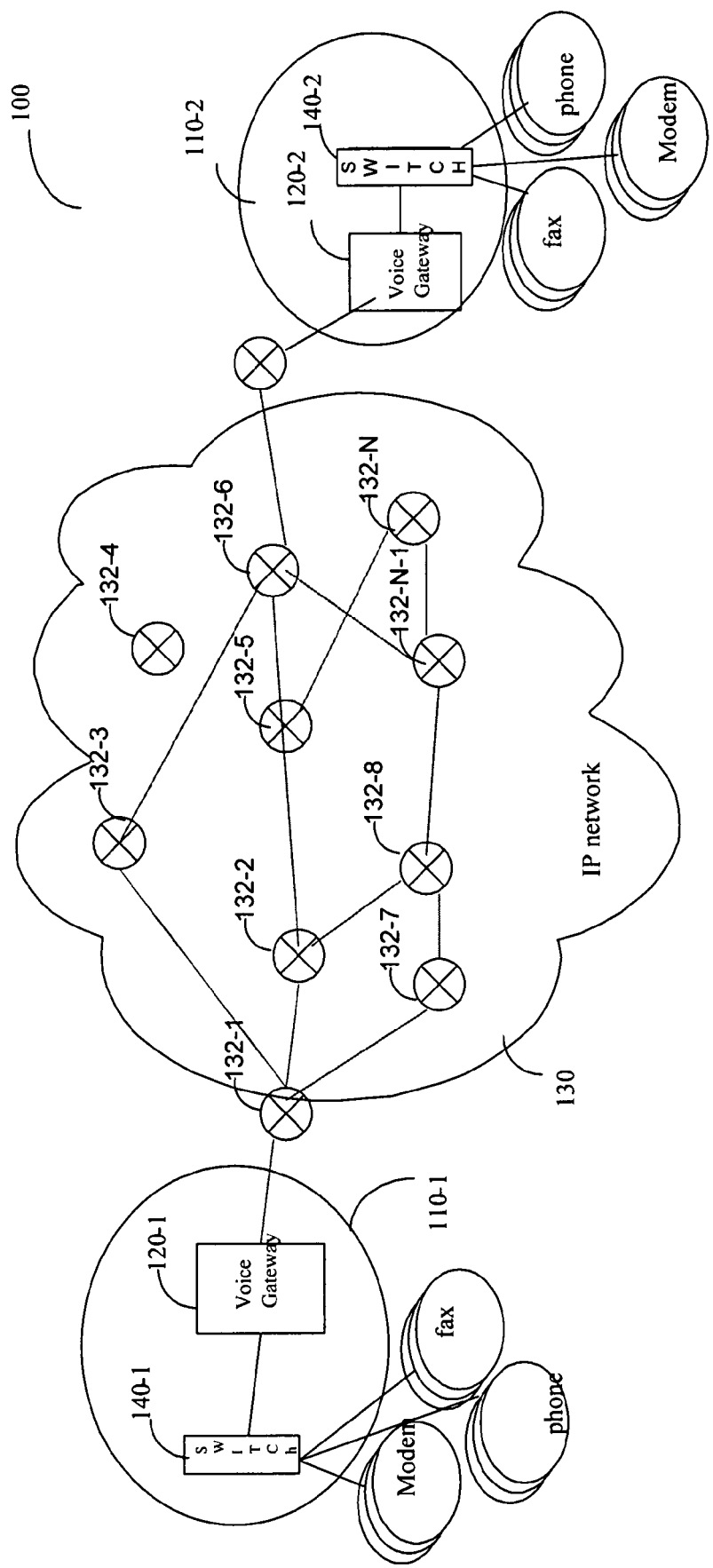
FIG. 1 is a block diagram providing an illustration of a typical VoIP network.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for VoIP traffic processing according to the techniques described herein. According to one embodiment of the invention, those techniques are implemented by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. The received code may be executed by processor 104 as it is received, and/or stored in storage device 110, or other non-volatile storage for later execution. In this manner, computer system 100 may obtain application code in the form of a carrier wave.

What is claimed is:

1. A network for transferring multimedia over Internet protocol (MoIP) packets, said network comprising:
   at least two points of presence (PoPs) that are communicatively coupled to one another by an IP-based packet network having IP routes;
   an overlay network configured to route said MoIP packets and comprising a plurality of overlay network units (ONU), wherein at least one of the ONUs is communicatively coupled to said IP-based packet network such that the overlay network exists on top of the IP-based packet network, wherein at least one of the ONUs establishes at least one label-switched path (LSP) of the overlay network, wherein the at least one LSP is established using a label distribution protocol as an alternative path to a default IP route within the IP-based packet network, wherein the at least one LSP is established as a designated source-to-destination path that is pre-defined from a specified source to a specified destination;
   in each of the ONUs, a packet forwarding mechanism for determining (i) a packet next destination along the at least one LSP and (ii) a Multiprotocol Label Switching (MPLS) label to be applied to the MoIP packets for communication along the at least one LSP.

2. A network as recited in claim 1, wherein said MoIP packets are transferred over said network based on at least one of: quality of service (QoS), load balancing.

3. A network as recited in claim 1, wherein said next destination is one of: ONU and final destination.

4. A network as recited in claim 1, wherein said ONU comprises:
   means for communication with a network;
   means, coupled to the communication means, for receiving said MoIP packets;
   means, coupled to the receiving means, for sending MoIP packets over at least said overlay network;
   a label-switching table that is coupled to the sending means.

5. A network as recited in claim 4, wherein said ONU further comprising logic for performing the steps of:
   receiving one or more packets associated with a voice call originating at one of the points of presence;
   selecting, using the packet forwarding mechanism, a next ONU to which the packets should be forwarded; and
   forwarding the packets to the selected next ONU.

6. The network of claim 1, wherein said MoIP packets are at least one of: data packets, voice over Internet protocol (VoIP) packets, video packets, and multi-media packets.

7. The network of claim 5, wherein each ONU is one of: overlay network ramp (ONR), voice endpoint, and overlay network deflector (OND).

8. The network of claim 5, wherein said voice endpoint is configured to route said MoIP packets directly to an overlay network deflector (OND).

9. The network of claim 7, wherein each said ONR is an integral part of one of said PoPs.

10. The network of claim 9, wherein each said ONR is further connected to said at least one multi-media endpoint and at least to said IP-based packet network.

11. The network of claim 9, wherein each said ONR is further connected to at least one ONU.

12. The network of claim 7, wherein said ONR is further capable of determining a path for said MoIP packets based upon a plurality of available overlay network paths and on one or more of: priority, load balancing, router availability, source address, destination address, source port, destination port, or quality of service.

13. The network of claim 12, wherein said ONR is further capable of modifying said MoIP packet by means of attaching an MPLS label.

14. The network of claim 7, wherein said ONR is further configured to determine a next hop for said MoIP packets, wherein said next hop is determined based upon a plurality of available overlay network paths and on one or more of priority, load balancing, router availability, source address, destination address, source port, destination port, or quality of service.

15. The network of claim 14, wherein said ONR is further capable of encapsulating said MoIP packet and sending it to said next hop.

16. The network of claim 1, wherein the ONUs apply path calculation algorithms to automatically determine and establish the at least one LSP through the overlay network.

17. The network of claim 5, wherein said logic further includes logic for carrying out the step of periodically checking at least one neighbor ONU, and in response detecting a failure of the neighbor ONU, updating the packet forwarding mechanism.

18. The network of claim 1, wherein the ONUs apply quality of service (QoS)-based path selection algorithms to automatically determine and establish the at least one LSP through the overlay network.

19. An overlay network unit (ONU) for an overlay network, wherein the overlay network comprises one or more overlay network units (ONUs) that are communicatively coupled with one another in association with an IP-based packet network having IP routes, such that the overlay network exists on top of the IP-based packet network, said ONU comprising:
    means for communication with a packet network;
    means, coupled to the communication means, for receiving multimedia over Internet protocol (MoIP) packets from a source in the packet network;
    means, coupled to the receiving means, for establishing at least one label-switched path (LSP) of the overlay network, wherein the at least one LSP is established using a label distribution protocol as an alternative path to default IP route in the IP-based packet network, wherein the at least one LSP is established as a designated source-to-destination path that is pre-defined from a specified source to a specified destination;
    means, coupled to the receiving means and the establishing means, for sending MoIP packets over said overlay network via the at least one path to reach a destination in the packet network; and
    a label-switching table that is coupled to the sending means, wherein the means for sending comprises means for determining from the label-switching table (i) a packet next destination along the at least one path and (ii) a Multiprotocol Label Switching (MPLS) label to be applied to the MoIP packets for communication along the LSP.

20. The ONU of claim 19, wherein said ONU is one of: overlay network ramp (ONR), overlay network deflector (OND).

21. The ONU of claim 20, further comprising a memory comprising one or more sequences of instructions which, when executed by one or more of the receiving means and sending means, cause the receiving means or sending means to perform the following steps:
    accepting MoIP packets from the IP-based packet network;
    determining if said MoIP packets are to be routed through said overlay network and if not routing said MoIP packets over said IP-based packet network;
    selecting a path in the overlay network for routing the MoIP packets;
    forwarding MoIP packets over said overlay network path.

22. The ONU of claim 20, wherein said ONU further comprising a memory comprising one or more sequences of instructions which, when executed by one or more of the receiving means and sending means, cause the receiving means or sending means to perform the following steps:
    accepting MoIP packets from the IP-based packet network;
    determining if said MoIP packets are to be routed through said overlay network and if not routing said MoIP packets over said IP-based packet network;
    selecting a next hop in the overlay network for routing the MoIP packets;
    forwarding MoIP packets over said overlay network to said next hop.

23. The ONU of claim 22, wherein said method of sending comprises the step of determining the next hop to be used, and wherein said determining the next hop is based on at least one of: priority, load balancing, router availability, source address, destination address, source port, destination port, or quality of service.

24. The ONU of claim 23, wherein tables for determination of said next hop are configured by label distribution protocols.

25. The ONU of claim 19, wherein said ONU checks periodically at least one neighbor ONU to identify a failure of the neighbor ONU, and in response to identifying a failure of the neighbor ONU, said ONU updates at least a packet forwarding mechanism.

26. The ONU of claim 19, wherein said packet forwarding mechanism is updated dynamically based on at least one of: QoS measurements, availability of next ONU, routing policies.

27. The ONU of claim 19, wherein said MoIP packets are at least one of: data packets, voice over Internet protocol (VoIP) packets, video packets, and multi-media packets.

28. The ONU of claim 20, wherein said method of sending further comprising the step of checking functionality of a path to be used, and in response thereto, if said path to be used is non-functional, then selecting an alternate path.

29. The ONU of claim 20, wherein said ONR is further configured to classify said MoIP packets using one of: parsing of application level protocols, using media recognition heuristics, determining packet parameters.

30. The ONU of claim 29, wherein said parsing is performed on at least one of the protocols: SIP, H.323 and MGCP.

31. The ONU of claim 20, wherein said OND is further configured to forward said MoIP packets based on label switching tables.

32. The ONU of claim 31, wherein said label switching tables are determined using access control lists (ACL), said ACL further comprising MPLS labels.

33. The OND claim 20, wherein said OND is capable of receiving MoIP packets directly from a voice endpoint.

34. A method for communicating between overlay network units (ONUs) over an overlay network that exists on top of an Internet protocol (IP)-based packet network having IP routes, the method comprising the steps of:
  accepting multimedia over Internet protocol (MoIP) packets;
  establishing at least one label-switched path (LSP) between points of presence (PoPs) through the overlay network, wherein the at least one label-switched path is established using a label distribution protocol as an alternative path to a default IP route in the IP-based packet network, wherein the at least one LSP is established as a designated source-to-destination path that is pre-defined from a specified source to a specified destination; and
  forwarding MoIP packets over the at least one LSP in said overlay network by determining (i) a packet next destination along the at least one LSP and (ii) a Multiprotocol Label Switching (MPLS) label to be applied to the MoIP packets for communication along the at least one LSP.

35. The method of claim 34, wherein said ONU is at least one of: overlay network ramp (ONR) and overlay network deflector (OND).

36. The method of claim 35, wherein said accepting MoIP packets for said ONU is at least one of: another ONU, a source within the IP-based packet network other than an ONU.

37. The method of claim 34, wherein said forwarding of MoIP packets over said overlay network comprises the steps of:
  determining which method of sending said MoIP packets should be used;
  forwarding said MoIP packets based on said method of sending.

38. The method of claim 37, wherein said determining a method of sending said MoIP packets is one of: selecting a path and selecting a next hop.

39. The method of claim 37, wherein said method of sending comprises at least the step of determining the next ONU to be used.

40. The method of claim 39, wherein said determining the next ONU is based on at least one of the following considerations: priority, load balancing, router availability, source address, destination address, source port, destination port, quality of service.

41. The method of claim 34, wherein said method further comprises the step of checking functionality of a network path to be used, and wherein said network path to be used is non-functional then selecting an alternate.

42. The method of claim 34, wherein said method further comprises the step of checking periodically at least one neighbor ONU, wherein as a result of said neighbor ONU failure notification, said OND updates at least a forwarding mechanism.

43. The method of claim 34, wherein said MoIP packets are at least one of: data packets, voice over Internet protocol (VoIP) packets, video packets, and multi-media packets.

44. A computer-readable storage medium for communicating between an overlay network deflector (OND) and an overlay network unit (ONU) over an overlay network that exists on top of an Internet protocol (IP)-based packet network having IP routes, the computer-readable medium comprising one or more sequences of software instructions which, when executed by one or more processors, cause the one or more processors to carry out the following steps:
  accepting multimedia over Internet protocol (MoIP) packets;
  establishing at least one label-switched path (LSP) through an overlay network, wherein at the at least one LSP is established using a label distribution protocol as an alternative path to a default IP route in the IP-based packet network wherein the at least one LSP is established as a designated source-to-destination path that is pre-defined from a specified source to a specified destination; and
  forwarding MoIP packets on the at least one path over said overlay network by determining (i) a packet next destination along the at least one LSP and (ii) a Multiprotocol Label Switching (MPLS) label to be applied to the MoIP packets for communication along the at least one LSP.

45. A computer-readable storage medium for communicating between an overlay network ramp (ONR) and an overlay network unit (ONU) over an overlay network that exists on top of an Internet protocol (IP)-based packet network having IP routes, the computer-readable medium comprising one or more sequences of software instructions which, when executed by one or more processors, cause the one or more processors to carry out the following steps:
  accepting multimedia over Internet protocol (MoIP) packets;
  determining if said MoIP packets are to be routed through at least one label-switched path (LSP) established through said overlay network and if not routing said MoIP packets over the IP-based packet network, and wherein the at least one LSP is established using a label distribution protocol as an alternative path to a default IP route in the IP-based packet network, wherein the at least one LSP is established as a designated source-to-destination path that is pre-defined from a specified source to a specified destination;
  selecting a routing method for MoIP packets; and
  forwarding MoIP packets over the at least one LSP through said overlay network.

* * * * *

UNITED STATES PATENT AND TRADEMARK OFFICE
CERTIFICATE OF CORRECTION

PATENT NO. : 7,586,899 B1
APPLICATION NO. : 10/196796
DATED : September 8, 2009
INVENTOR(S) : Mohaban et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1575 days.

Signed and Sealed this

Twenty-first Day of September, 2010

David J. Kappos
*Director of the United States Patent and Trademark Office*